United States Patent
Kopko et al.

(10) Patent No.: US 9,733,005 B2
(45) Date of Patent: Aug. 15, 2017

(54) SUBCOOLING SYSTEM WITH THERMAL STORAGE

(71) Applicant: Johnson Controls Technology Company, Holland, MI (US)

(72) Inventors: William L. Kopko, Jacobus, PA (US); Andrew M. Welch, Mount Wolf, PA (US); Satheesh Kulankara, York, PA (US)

(73) Assignee: JOHNSON CONTROLS TECHNOLOGY COMPANY, Holland, MI (US)

(*) Notice: Subject to any disclaimer, the term of this patent is extended or adjusted under 35 U.S.C. 154(b) by 430 days.

(21) Appl. No.: 14/203,251

(22) Filed: Mar. 10, 2014

(65) Prior Publication Data

US 2014/0260376 A1 Sep. 18, 2014

Related U.S. Application Data

(60) Provisional application No. 61/793,632, filed on Mar. 15, 2013.

(51) Int. Cl.
*F25B 7/00* (2006.01)
*F25D 3/00* (2006.01)
(Continued)

(52) U.S. Cl.
CPC .............. *F25D 3/005* (2013.01); *F25B 40/02* (2013.01); *F25B 41/00* (2013.01); *F28D 20/0039* (2013.01); *F25B 25/005* (2013.01); *F25B 2600/13* (2013.01); *F25B 2700/21161* (2013.01); *F25B 2700/21162* (2013.01); *F25B 2700/21163* (2013.01);
(Continued)

(58) Field of Classification Search
CPC .. F28D 20/0034; F28D 20/0039; F25B 40/02; F25D 3/005
USPC ............................................................. 62/79
See application file for complete search history.

(56) References Cited

U.S. PATENT DOCUMENTS 3,705,622 A * 12/1972 Schwarz ................ B21D 53/06
165/143
4,423,602 A * 1/1984 Venable .................. F25B 40/02
62/238.6
(Continued)

FOREIGN PATENT DOCUMENTS

| CN | 102460038 A | 5/2012 |
|---|---|---|
| TW | 200513620 A | 4/2005 |
| WO | 2005108888 A2 | 11/2005 |

OTHER PUBLICATIONS

International Search Report from PCT application No. PCT/US2014/024460, dated Aug. 4, 2014, 17 pgs.

(Continued)

*Primary Examiner* — Ryan J Walters
*Assistant Examiner* — Steve Tanenbaum
(74) *Attorney, Agent, or Firm* — Fletcher Yoder P.C.

(57) ABSTRACT

Embodiments of the present disclosure are directed toward systems and method for cooling a refrigerant flow of a refrigerant circuit with a cool water flow from a cool water storage to generate a warm water flow and to cool the refrigerant flow by a subcooling temperature difference, flowing the warm water flow to the cool water storage, and thermally isolating the warm water flow from the cool water flow in the cool water storage.

12 Claims, 10 Drawing Sheets

(51) Int. Cl.
*F25B 41/00* (2006.01)
*F25B 40/02* (2006.01)
*F28D 20/00* (2006.01)
*F25B 25/00* (2006.01)
*F28D 21/00* (2006.01)

(52) U.S. Cl.
CPC .............. *F28D 2020/0095* (2013.01); *F28D 2021/0068* (2013.01); *Y02B 30/745* (2013.01); *Y02E 60/142* (2013.01)

(56) References Cited

U.S. PATENT DOCUMENTS

| | | | | |
|---|---|---|---|---|
| 4,553,401 A | * | 11/1985 | Fisher | F24D 11/0214 237/2 B |
| 5,386,709 A | | 2/1995 | Aaron | |
| 5,444,971 A | | 8/1995 | Holenberger | |
| 5,575,159 A | * | 11/1996 | Dittell | F24F 5/0017 62/199 |
| 6,769,258 B2 | | 8/2004 | Pierson | |
| 2004/0188517 A1 | * | 9/2004 | Choi | G07F 13/10 235/381 |
| 2008/0203179 A1 | | 8/2008 | Berger et al. | |
| 2010/0186440 A1 | | 7/2010 | Hong et al. | |
| 2011/0011119 A1 | * | 1/2011 | Kuehl | F25D 16/00 62/434 |
| 2012/0222846 A1 | | 9/2012 | Kadle et al. | |

OTHER PUBLICATIONS

TW Office Action for TW Application No. 103109583 mailed Nov. 11, 2015. 7 pgs.

"Commerical Cool Storage Design Guide," Electric Power Research Institute, May 1985, pp. 5-1 to 5-36, PGU Service Corporation, Parsippany, NJ.

Kays, W.M., et al., "Compact Heat Exhangers," Krieger Publishing Company, 3rd Ed., Malabar, Florida, 1984, pp. 16-21.

* cited by examiner

SUBCOOLING SYSTEM WITH THERMAL STORAGE

CROSS REFERENCE TO RELATED APPLICATIONS

This application claims priority from and the benefit of U.S. Provisional Application Ser. No. 61/793,632, filed Mar. 15, 2013, entitled "SUBCOOLING SYSTEM WITH THERMAL STORAGE," which is hereby incorporated by reference.

BACKGROUND

The present disclosure relates generally to cooling systems, and more particularly, to subcooling systems for cooling systems.

It has long been recognized that subcooling can improve both efficiency and capacity of cooling systems (e.g., refrigeration systems). Subcooling systems may include condensers, economizers, flash tanks, heat exchangers, flash intercoolers, and/or compressors (e.g., multi-stage compressors) for cooling condensed refrigerant liquid before the condensed refrigerant liquid reaches the evaporator of a cooling system. As the refrigerant is cooled, enthalpy of refrigerant liquid flowing toward the evaporator is reduced, thereby increasing cooling capacity with little or no change to the work performed by the compressor. The result is improved cooling system efficiency and capacity.

SUMMARY

The present invention relates to a system having a refrigerant circuit configured to flow a refrigerant and a subcooling circuit configured to flow a cooling fluid. The refrigerant circuit includes a compressor, a condenser, an expansion device configured to expand the refrigerant, a subcooling heat exchanger, and a cooling heat exchanger. The subcooling circuit includes the subcooling heat exchanger, a subcooling pump, and a thermal storage unit configured to store the cooling fluid.

The present invention also relates to a method that includes cooling a refrigerant flow of a refrigerant circuit with a cool water flow from a cool water storage to generate a warm water flow and to cool the refrigerant flow by a subcooling temperature difference, flowing the warm water flow to the cool water storage, and thermally isolating the warm water flow from the cool water flow in the cool water storage.

The present invention further relates to a subcooling circuit having a thermal storage unit configured to store a cool fluid, a heat exchanger configured to transfer heat between a cool fluid flow of the thermal storage unit and a refrigerant of a cooling system, and a pump configured to pump the cool fluid flow through the subcooling circuit, wherein the thermal storage unit is configured to receive the cool fluid flow from the heat exchanger and to store the cool fluid flow for re-cooling.

DRAWINGS

DETAILED DESCRIPTION

Embodiments of the present disclosure are directed towards improved subcooling systems for cooling systems (e.g., refrigeration systems). As will be appreciated, subcooling increases cooling capacity of a cooling system by reducing the enthalpy of refrigerant entering an evaporator (e.g., cooler) of the cooling system. For example, energy removed from the refrigerant liquid may correspond to an increase in cooling capacity of the cooling system. As described in detail below, the disclosed embodiments may include a cooling system with subcooling system having a subcooling heat exchanger that uses a cooling fluid (e.g., water, glycol solution, carbon dioxide, refrigerant) flow to absorb heat from a refrigerant flow of the cooling system. In particular, a flow rate of the cooling fluid flow through the heat exchanger may be regulated to maximize the efficiency of the subcooling system. For example, the cooling fluid flow rate may be adjusted such that a temperature change of the cooling fluid flow across the subcooling heat exchanger may be similar or equal to a temperature change of the refrigerant across the subcooling heat exchanger. Furthermore, in certain embodiments, the subcooling system may include a thermal storage unit, such as a cooling fluid tank, which may be a rechargeable source of the cooling fluid flow.

Figure 1:
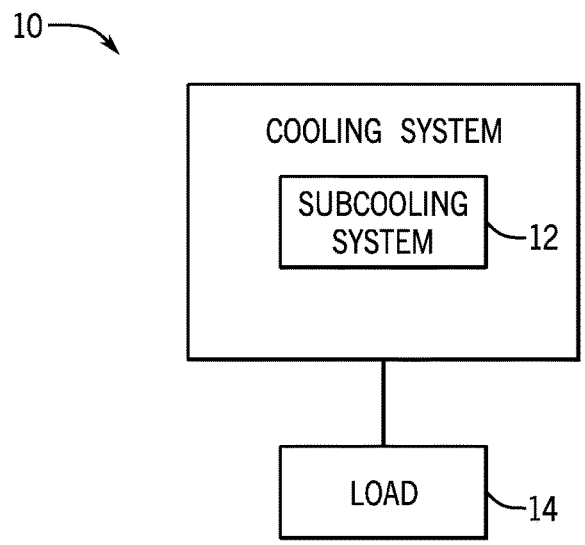
FIG. 1 is a schematic of a cooling system having a subcooling system, in accordance with embodiments of the present disclosure.

Turning now to the drawings, FIG. 1 is a schematic of a cooling system 10 having an improved subcooling system 12 in accordance with present embodiments. The cooling system 10 may be any suitable cooling system that supplies a chilled fluid to a load 14 and/or chills a fluid flow supplied to the load 14. For example, the cooling system 10 may be a chiller, a room air conditioner, a residential split-system air conditioner, or other type of refrigeration system. As described in detail below, the cooling system 10 may include a refrigerant circuit that chills a fluid flow supplied to the load 14. Additionally, the subcooling system 12 may be configured to further cool the refrigerant flowing through the refrigerant circuit of the cooling system 10 with a subcooling fluid flow, thereby increasing the capacity of the refrigerant to absorb heat. For example, in certain embodiments, the subcooling system 12 may cool the refrigerant between a condenser and an expansion valve of the refrigerant circuit. As may be appreciated, the condenser and the expansion valve reduce the temperature and the enthalpy of the refrigerant. As described herein, the subcooling system 12 may further cool and decrease the enthalpy of the refrigerant. The additional temperature and enthalpy reduction from the subcooling system 12 may increase the capacity of the cooling system for a particular amount of work, such as the work of a compressor of the cooling system 10. For example, the subcooling system 12 may increase the capacity of the cooling system from approximately 7,000 kW with 2,500 kW input power to approximately 9,000 kW with 2,500 kW input power. Additionally, or in the alternative, the additional temperature and enthalpy reduction from the subcooling system 12 may reduce the amount of work (e.g., from 3,500 kW to 2,500 kW) to provide a particular amount (e.g., 9,000 kW) of cooling. Furthermore, as discussed below, the subcooling system 12 may include a thermal storage unit, such as a cooling water tank, which may be rechargeable. In this manner, efficiency of the subcooling system 12 and the cooling system 10 may be improved.

Figure 2:
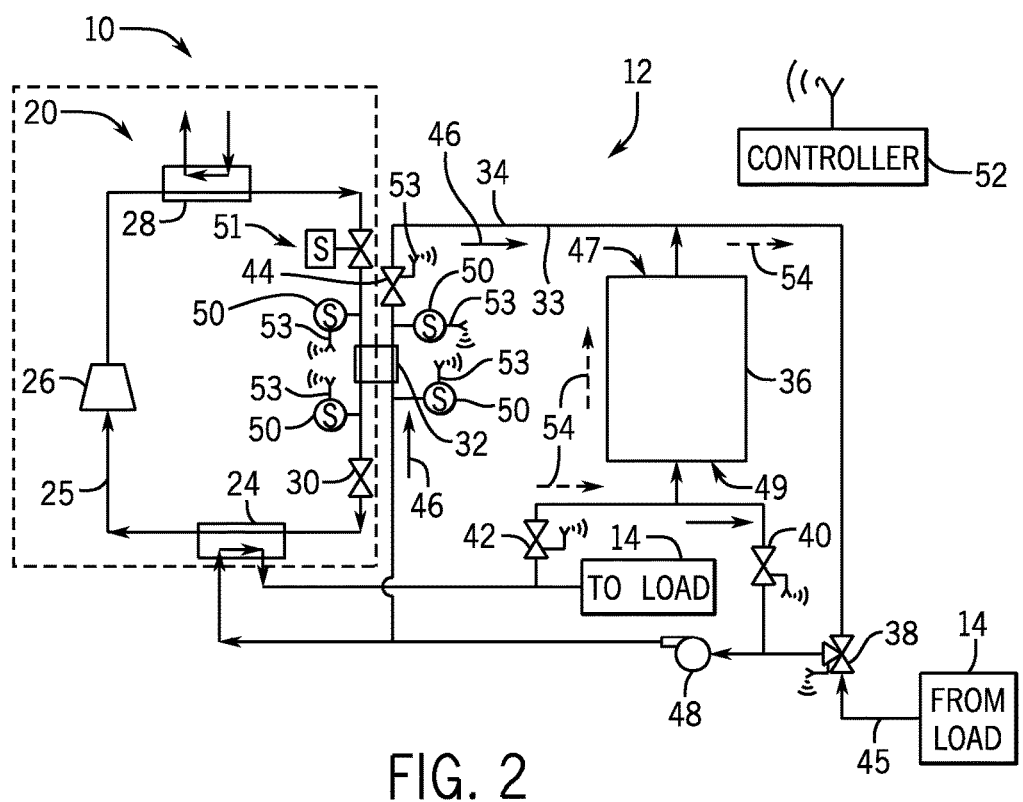
FIG. 2 is a schematic of a cooling system having a subcooling system with thermal storage including a stratified cooling fluid tank, in accordance with embodiments of the present disclosure.

FIG. 2 is a schematic of an embodiment of the cooling system 10 having a refrigerant circuit 20 and the subcooling system 12. For example, the cooling system 10 may be a water-cooled or air-cooled chiller. As shown, the cooling system 10 includes the refrigerant circuit 20 configured to cool a load fluid 22, which includes fluid passing through a load circuit 23 portion of the cooling system 10. The load fluid 22 may include, but is not limited to, water, deionized water, glycol solution, carbon dioxide, a refrigerant (e.g., R134a, R410A, R32, R1233ZD(E), R1233zd (E), R1234yf, R1234ze), or any combination thereof. More specifically, the refrigerant circuit 20 includes a cooler 24 in which a refrigerant 25 may cool the load fluid 22. The cooler 24 may also be referred to herein as a cooling heat exchanger. The refrigerant 25 may include, but is not limited to, carbon dioxide, R134a, R410A, R32, R1233ZD(E), R1233zd (E), R1234yf, or R1234ze, or another refrigerant as may be appreciated by one of skill in the art. The refrigerant circuit 20 further includes a compressor 26 (e.g., centrifugal compressor, screw compressor, scroll compressor, reciprocating compressor, or linear compressor), a condenser 28, and an expansion device 30 (e.g., a fixed orifice, an electronic expansion valve, a motorized butterfly valve, or a thermal expansion valve).

The subcooling system 12 is thermally coupled to the refrigerant circuit 20 to subcool the refrigerant 25. For example, the subcooling system 12 may be coupled to the refrigerant circuit 20 via a subcooling heat exchanger 32 disposed along the refrigerant circuit 20 between the condenser 28 and the expansion device 30 (e.g., expansion valve). As such, the subcooling system 12 may flow a cooling fluid 33 (e.g., cool water) through a subcooling circuit 34 and through the subcooling heat exchanger 32. In some embodiments, the cooling fluid 33 may be substantially the same fluid as the load fluid 22. Indeed, with respect to the embodiments of FIG. 2, different names for the load fluid 22 and cooling fluid 33 are utilized to facilitate communication of uses of the fluid within the cooling system 10. Additionally, or in the alternative, the cooling fluid may include, but is not limited to, water, deionized water, glycol solution, carbon dioxide, a refrigerant (e.g., R134a, R410A, R32, R1233ZD(E), R1233zd (E), R1234yf, R1234ze), or any combination thereof. In this manner, heat may be transferred from the refrigerant 25 of the refrigerant circuit 20 to the cooling fluid 33 (e.g., cool water) of the subcooling circuit 34 via the subcooling heat exchanger 32. Additionally, a thermal storage unit 36 is disposed along the subcooling circuit 34 of the subcooling system 12. For example, the thermal storage unit 36 may be a stratified water tank configured to store the cooling fluid 33 flowing through the subcooling system 12. The subcooling system 12 further includes a plurality of valves (e.g., a first valve 38 between the load 14 and the chilled fluid pump 48, a second valve 40 between the thermal storage unit 36 and the chilled fluid pump 48, a third valve 42 between the cooler 24 (e.g., cooling heat exchanger) and the thermal storage unit 36, and a fourth valve 44 between the subcooling heat exchanger 32 and the thermal storage unit 36), which may be operated to regulate the cooling fluid 33 flowing through the subcooling circuit 34. As the flow of the cooling fluid 33 is regulated by the valves 38, 40, 42, and 44, heat transfer between the cooling fluid 33 of the subcooling system 12 and the refrigerant 25 of the cooling system 10 may be regulated. In certain embodiments, the subcooling system 12 may have different modes of operation based on which of the valves 38, 40, 42, and 44 are opened, and which of the valves 38, 40, 42, and 44 are closed.

For example, when the first valve 38 is configured to allow the load fluid 22 to flow from the load 14 to the chilled fluid pump 48, the third valve 42 is closed, and the second valve 40 and the fourth valve 44 are open, the subcooling system 12 may be in a subcooling mode. In the subcooling mode, at least a portion (e.g., approximately 5 to 20 percent) of the load fluid 22 (e.g., return water 45, cold chilled fluid 33) may flow from the chilled fluid pump 48 through the subcooling heat exchanger 32, as indicated by arrow 46, to a top 47 of the thermal storage unit 36 (e.g., stratified water tank). The remainder of the load fluid 22 from the chilled fluid pump 48 may flow through the cooler 24 (e.g., cooling heat exchanger). As will be appreciated, within the thermal storage unit 36, a temperature gradient may exist across the cooling fluid 33 within the thermal storage unit 36. More specifically, the temperature of the cooling fluid 33 (e.g., water) at a bottom 49 of the thermal storage unit 36 may be lower than the temperature of the cooling fluid 33 at the top 47 of the thermal storage unit 36. As such, cold cooling fluid 33 from the bottom 49 of the thermal storage unit 36 may flow into and join the return water 45 flow upstream of the chilled fluid pump 48. The addition of the cold cooling fluid 33 from the thermal storage unit 36 enables the cooling fluid 33 through the subcooling heat exchanger 32 to be at a lower temperature than the return water 45.

As mentioned above, the flow rate of the cooling fluid 33 (e.g., return water 45 and cold cooling fluid 33 from the thermal storage unit 36) flowing through the subcooling circuit 34 may be regulated to achieve a desired temperature drop of the refrigerant 25 across the subcooling heat exchanger 32. More specifically, the valves 38, 40, 42, and 44 may be regulated such that a temperature difference (e.g., increase) of the cooling fluid 33 across the subcooling heat exchanger 32 is approximately equal to the temperature difference (e.g., decrease) of the refrigerant 25 across the subcooling heat exchanger 32. The result is that the temperature of the refrigerant 25 (e.g., liquid refrigerant) may approach the temperature (e.g., between approximately 32 to 50° F.) of the cooling fluid 33 entering the subcooling heat exchanger 32, and the temperature of the cooling fluid 33 may approach the temperature (e.g., approximately 60, 80, 100, 120, 140° F.) of the refrigerant 25 leaving the condenser 28. The expansion device 30 receiving the refrigerant 25 downstream of the subcooling heat exchanger 32 reduces the pressure and the temperature of the refrigerant 25, thereby enabling the refrigerant 25 to cool the load fluid 22 via the cooler 24 (e.g., cooling heat exchanger). For example, the change (e.g., increase) in temperature of the cooling fluid 33 may be approximately 40 to 80° F. across the subcooling heat exchanger 32, and the change (e.g., decrease) in temperature of the refrigerant 25 may be approximately 40 to 80° F. across the subcooling heat exchanger 32. As a result, the energy storage capacity of the thermal storage unit 36 may be much greater than that of conventional chilled water storage systems.

In some embodiments, the flows of the refrigerant 25 and the cooling fluid 33 through the subcooling heat exchanger 32 may approximate a counterflow configuration. For example, multi-pass brazed-plate heat exchangers, such as those available by SWEP of Landskrona, Sweden, may be utilized. Multi-pass brazed-plate may have a substantially compact profile and/or footprint, and may efficiently transfer heat between fluids. In some embodiments, the temperature difference between the refrigerant 25 exiting the subcooling heat exchanger 32 and the cooling fluid 33 entering the subcooling heat exchanger 32 may be less than approximately 10, 8, 5, or 2 degrees Fahrenheit. In some embodiments, the temperature difference may correspond to an effectiveness of the subcooling heat exchanger greater than approximately 90, 91, 92, 93, 94, or 95 percent. The flow rate of the cooling fluid 33 through the subcooling heat exchanger 32 relative to the flow rate of the refrigerant 25 may be adjustable, thereby enabling the control of the temperature difference between the exiting refrigerant 25 and the entering cooling fluid 33. In some embodiments, the relative flow rate of the cooling fluid 33 may be adjusted based on a desired cooling capacity of the cooling system 10, a thermal storage capacity of the thermal storage unit 36, or any combination thereof. For example, the relative flow rate of the cooling fluid 33 may be decreased, thereby reducing the temperature difference between the exiting refrigerant 25 and the entering cooling fluid 33, to increase the cooling capacity of the cooling system. Alternatively, the relative flow rate of the cooling fluid 33 may be increased, thereby increasing the temperature difference between the exiting refrigerant 25 and the entering cooling fluid 33, to decrease the thermal energy transferred from the thermal storage unit 36 to the refrigerant 25.

In some embodiments, the subcooling system 12 may be at least partially disposed in an environment subject to temperatures near or below freezing (e.g., 32° F.). The subcooling system 12 may include thermal insulation about portions of the subcooling circuit 34, heaters (e.g., gas heaters, electric heaters), or any combination thereof. Additionally or in the alternative, the cooling fluid 33 of the subcooling system 12 may be mixed with propylene, ethylene glycol, or an antifreeze, thereby lowering the freezing point of the cooling fluid 33 below an expected freezing environment temperature. In some embodiments, a valve 51 (e.g., solenoid valve) in the refrigerant circuit 20 disposed between the condenser 28 and the subcooling heat exchanger 32 may close to prevent a thermosiphon when the refrigerant circuit 20 is not circulating the refrigerant 25.

To achieve the desired temperature gradients across the subcooling heat exchanger 32, the cooling system 10 may include one or more sensors 50 on the refrigerant circuit 20 and/or the subcooling system 12. Each of the one or more sensors 50 is configured to measure one or more operating parameters (e.g., temperature, pressure, etc.) of the refrigerant 25 and/or the cooling fluid 33. The sensors 50 may provide measured feedback to a controller 52 (e.g., an automation controller, programmable logic controller, distributed control system, etc.) by a wireless (e.g., via an antenna 53) or hard wired connection. In certain embodiments, the controller 52 may be further configured to regulate (e.g., automatically) operation of one or more of the valves 38, 40, 42, and 44 in response to feedback measured by the sensors 50. In other embodiments, the valves 38, 40, 42, and 44 may be operated manually. Additionally, other processes of the cooling system 10 may be controlled by the controller 52 by a wireless (e.g., via the antenna 53) or hard wired connection.

In a recharge mode of the subcooling system 12, the second and fourth valves 40 and 44 are closed, while the first valve 38 and third valve 42 are opened to allow the flow indicated by arrows 54. As a result, during operation in the recharge mode, the cooling fluid 33 (e.g., water) flows through the subcooling circuit 34, as indicated by arrows 54. More specifically, warm cooling fluid 33 from the top 47 of the thermal storage unit 36 flows through the cooling system 10, causing the cooling fluid 33 to decrease in temperature. Thereafter, the cooling fluid 33 is returned to the bottom 49 of the thermal storage unit 36. As a result, the cooling fluid 33 within the thermal storage unit 36 may gradually decrease in temperature, thereby "recharging" the thermal storage unit 36.

Flow rate of the cooling fluid 33 (e.g., water) through the thermal storage unit (e.g., tank) 36 may be much higher during recharge mode than during subcooling mode. As shown in FIG. 2, the full flow of the chilled fluid pump 48 would be directed through the thermal storage unit 36 during recharge mode when the fourth valve 44 is closed, while only a small fraction of the flow (between approximately 5 to 20 percent) would be directed through the thermal storage unit 36 (e.g., through the second valve 40) in subcooling mode when the fourth valve 44 is open. This difference in flow rates between the recharge mode and the subcooling mode means that stratified conditions within the thermal storage unit 36 (e.g., stratified water tank) are relatively easy to maintain in subcooling mode, but mixing may occur during recharge.

In certain embodiments, the thermal storage unit 36 (e.g., stratified water tank) may include piping configured to minimize mixing of cooling fluid 33 entering the thermal storage unit 36. For example, the diameter of the piping, the arrangement of the piping into the thermal storage unit 36, and a flow rate of the cooling fluid 33 through the piping may reduce mixing of the cooling fluid within the thermal storage unit 36, thereby enabling stratification of the cooling fluid 33. As may be appreciated, the density of the cooling fluid 33 is based at least in part on the temperature of the cooling fluid 33. For example, the density of water generally decreases as the temperature increases. Accordingly, a relatively large difference (e.g., greater than 10, 20, 30, 40, or 50° F.) in temperature between the cold cooling fluid 33 in the thermal storage unit 36 and the warm cooling fluid 33 returning from the subcooling heat exchanger 32 may enable the warm cooling fluid to readily stratify above the cold cooling fluid. In other embodiments, the thermal storage unit 36 may include piping to mix entering cooling fluid 33 (e.g., warm water) with cooling fluid 33 (e.g., cold water) at the bottom 49 of the thermal storage unit 36. Furthermore, in certain environments, the thermal storage unit 36 may be designed to have walls to withstand elevated environmental pressures. It may be desirable for the exterior of the thermal storage unit 36 to include thermal insulation to reduce heat transfer to the environment. The insulation may be placed on the inside or the outside of the walls of the thermal storage unit 36.

Figure 3:
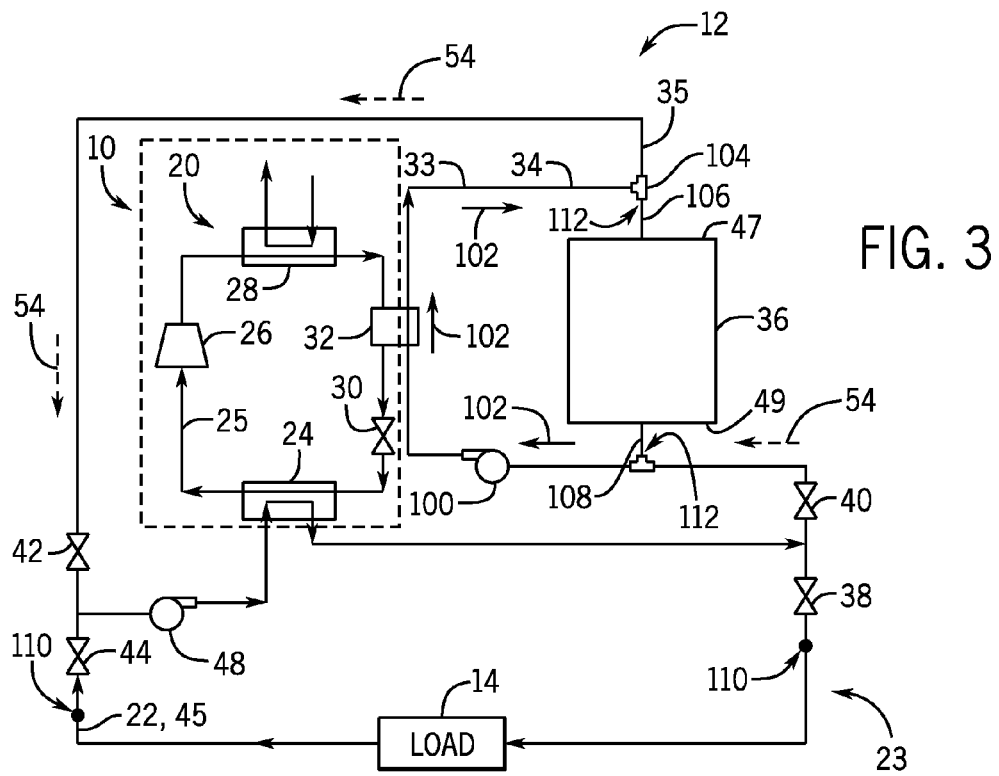
FIG. 3 is a schematic of a cooling system having a subcooling system with thermal storage including a stratified cooling fluid tank, in accordance with embodiments of the present disclosure.

FIG. 3 is a schematic of an embodiment of the cooling system 10 having the refrigerant circuit 20 and the subcooling system 12. Specifically, the illustrated embodiment of the cooling system 10 allows for a pressure difference between the thermal storage unit 36 of the subcooling system 12 and the refrigerant circuit 20. Additionally, the illustrated embodiment has similar elements and element numbers as the embodiment shown in FIG. 2.

As similarly described above, the cooling system 10 has the first, second, third, and fourth valves 38, 40, 42, and 44 to control the flow of the load fluid 22 and the cooling fluid 33 through the cooler 24 (e.g., cooling heat exchanger) and subcooling heat exchanger 32. For example, the first, second, third, and fourth valves 38, 40, 42, and 44 may be low-leakage valves, such as ball valves. The first valve 38 is between the cooler 24 (e.g., cooling heat exchanger) and the load 14, the second valve 40 is between the cooler 24 (e.g., cooling heat exchanger) and the thermal storage unit 36, the third valve 42 is between the thermal storage unit 36 and the chilled fluid pump 48, and the fourth valve is between the load 14 and the chilled fluid pump 48. Moreover, in addition to the chilled fluid pump 48, the illustrated embodiment includes a subcooling pump 100 configured to pump the cooling fluid 33 through the subcooling circuit 34, which may be at a different pressure than the load fluid 22 fluidly coupled to the load 14. The first, second, third, and fourth valves 38, 40, 42, and 44 and the pumps 48 and 100 may be regulated or controlled (e.g., via a control system including the automation controller 52) to enable operation of the cooling system 10 and subcooling system 12 in different modes.

For example, the first and second valves 38 and 40 control flow of the chilled fluid (e.g., load fluid 22, cooling fluid 33) leaving the cooler 24 (e.g., cooling heat exchanger). Specifically, the first valve 38 controls the flow of chilled load fluid 22 to the load 14 (e.g., a building chilled water loop) during the subcooling mode. Additionally, the second valve 40 controls the flow of chilled cooling fluid 33 from the cooler 24 (e.g., cooling heat exchanger) to the bottom 49 of the thermal storage unit 36 (e.g., stratified water tank) during the recharge mode. As further shown, the third and fourth valves 42 and 44 are disposed on the suction side of the chilled fluid pump 48. Specifically, the third valve 42 regulates flow of the cooling fluid 33 from the top 47 of the thermal storage unit 36 to the chilled fluid pump 48 during the recharge mode, and the fourth valve 44 controls flow of the load fluid 22 (e.g., return water 45) returning from the load 14 to the chilled fluid pump 48 during the subcooling mode.

Furthermore, the subcooling pump 100 draws the cooling fluid 33 from the bottom 49 of the thermal storage unit 36 and pumps the cooling fluid 33 from the thermal storage unit 36 through the subcooling heat exchanger 32 to subcool the refrigerant 25 of the refrigerant circuit 20. After passing through the subcooling heat exchanger 32, the cooling fluid 33 flows to the top 47 of the thermal storage unit 36. As described above, the cooling fluid 33 flowing through the subcooling heat exchanger 32 absorbs heat from the refrigerant 25 flowing through the refrigerant circuit 20 of the cooling system 10 via the subcooling heat exchanger 32 (e.g., subcooler). In certain embodiments, the flow rate of cooling fluid 33 through the subcooling pump 100 and subcooling heat exchanger 32 may be much lower than the flow rate of fluid (e.g., load fluid 22, cooling fluid 33) through the chilled fluid pump 48. For example, the chilled fluid pump 48 may pump a fluid (e.g., load fluid 22, cooling fluid 33) at approximately 10 to 20 times the rate that the subcooling pump 100 pumps the cooling fluid 33. In some embodiments, the subcooling pump 100 may pump the chilled fluid 33 at a flow rate that enables the temperature of the cooling fluid 33 exiting the subcooling heat exchanger 32 to be less than 5, 4, 3, 2, or 1° Fahrenheit of the temperature of the refrigerant 25 entering the subcooling heat exchanger 32. The subcooling pump 100 may be a variable speed circulator pump, as may be available by Taco of Cranston, R.I. As may be appreciated, decreasing the temperature difference between the exiting cooling fluid 33 and the entering refrigerant 25 via control of the subcooling pump 100 may increase the efficiency of the cooling system 10. Moreover, in some embodiments, the subcooling pump 100 may pump the chilled fluid 33 through the subcooling heat exchanger 32 at a flow rate less than the flow rate of the refrigerant 25 through the subcooling heat exchanger 32. For example, the flow of the chilled fluid 33 through the subcooling heat exchanger 32 may be approximately 5, 10, 20, 30, 40, 50 of the flow rate of the refrigerant 25 through the subcooling heat exchanger 32. The flow rate of the chilled fluid 33 through the subcooling heat exchanger 32 relative to the flow rate of the refrigerant 25 through the subcooling heat exchanger 32 may be variable, based at least in part on a desired cooling capacity of the cooling system.

During a subcooling mode of the illustrated embodiment in FIG. 3, the chilled fluid pump 48 and the subcooling pump 100 may both be running. Additionally, the first and fourth valves 38 and 44 are open, while the second and third valves 40 and 42 are closed. In such a configuration, the cooler 24 (e.g., cooling heat exchanger) and the chilled fluid pump 48 are coupled to the load 14, while being isolated from the thermal storage unit 36. Moreover, in such a configuration, the subcooling pump 100 circulates cooling fluid 33 (e.g., water) from the bottom 49 of the thermal storage unit 36, through the subcooling heat exchanger 32, and back to the top 47 of the thermal storage unit 36, as indicated by arrows 102. In this manner, the cooling fluid 33 in the thermal storage unit 36 (e.g., stratified water tank) cools the refrigerant 25 of the cooling system 10 via the subcooling heat exchanger 32, thereby increasing the cooling capacity of the cooling system 10. As will be appreciated, the cooling system 10 may be in the subcooling configuration or subcooling mode (e.g., first and fourth valves 38, 44 open, second and third valves 40, 42 closed) during times of peak electrical prices and peak cooling load. For example, the illustrated embodiment may be in the subcooling configuration during the daytime and/or during the evening in warm weather.

To enter the recharging mode from the subcooling mode, the chilled fluid pump 48 and the subcooling pump 100 may both be turned off. Additionally, the first and fourth valves 38 and 44 are closed. In this manner, the cooler 24 (e.g., cooling heat exchanger) and the chilled fluid pump 48 may be isolated from the load 14. Once the first and fourth valves 38 and 44 are closed, the second and third valves 40 and 42 are opened to connect the cooler 24 (e.g., cooling heat exchanger) and the chilled fluid pump 48 to the thermal storage unit 36. In some embodiments, the flow rate of the cooling fluid 33 may be increased during the recharge mode relative to the subcooling mode such that the chilled fluid 33 within the thermal storage unit 36 is mixed. With the second and third valves 40 and 42 opened, the chilled fluid pump 48 may be turned on to pump cooling fluid 33 (e.g., water) through the cooler 24 (e.g., cooling heat exchanger) as shown by arrows 54. As a result, the cooling fluid 33 (e.g., water) within the thermal storage unit 36 may be cooled, thereby "recharging" the cooling capacity of the thermal storage unit 36. As similarly discussed above, the cooling system 10 and subcooling system 12 may be in the recharging mode when energy rates are lower (e.g., night time).

In order to revert back to the subcooling mode from the recharging mode, the chilled fluid pump 48 is once again turned off, the second and third valves 40 and 42 are closed, and the first and fourth valves 38 and 44 are opened. Thereafter, the chilled fluid pump 48 and the subcooling pump 100 may both be turned on, and the cooling fluid 33 in the thermal storage unit 36 may be circulated as shown by arrows 102 to cool the refrigerant 25 in the manner described above.

A feature of this embodiment of the cooling system 10 is that it allows for a pressure difference between portions of the cooling system 10, such as between the thermal storage unit 36 and the load circuit 23 supplying the load 14, if valves 38, 40, 42, and 44 can provide positive shut off. Examples of valves that can provide pressure isolation include butterfly valves or ball valves. It may be desirable for the valves to be motor-actuated to allow for automatic control of the system. Additionally, or in the alternative, manual valves may be utilized for pressure isolation. This pressure isolation feature may be particularly desirable in multistory buildings wherein the thermal storage unit 36 is located at ground level. In subcooling mode, valves 40 and 42 are closed, which isolates the thermal storage unit 36 from the pressure of the load circuit 23 (e.g., building loop). The chilled fluid pump 48 may direct the load fluid 22 through the cooler 24 at the pressure of the load circuit 23. In recharge mode, valves 38 and 44 are closed. The chilled fluid pump 48 may direct the cooling fluid 33 through the cooler 24 at a tank pressure (e.g., the pressure of the thermal storage unit 36) different from the pressure of the load circuit 23. Interlocks (e.g., control logic of an automation controller) can be provided to ensure that neither the second valve 40 nor the third 42 is open whenever either the first valve 38 or the fourth valve 44 is open. It may also be desirable to include space in the thermal storage unit 36 to handle the full system fluid volume (e.g., load fluid 22 and cooling fluid 33) without overflowing in case of a leaking valve (e.g., second valve 40, third valve 42). The pressure-isolation characteristics of present embodiments may eliminate or limit the cost and performance penalties that typically accompany other options (e.g., a water-to-water heat exchanger, a high-pressure water storage tank, or a support structure required to locate the tank physically higher). Present embodiments facilitate packaging of components to simplify installation in the field. For example all the pumps and valves can be packaged with the subcooling system 12 in a single unit, which eliminates field piping and wiring and allows the controls of the pumps and valves to be integrated into a chiller control (e.g., automation controller). In addition, the subcooling circuit 34 and a recharge conduit 35 may connect through a tee 104 to a single pipe 106 to the top 47 of the thermal storage unit 36. Similarly, a single pipe 108 communicatively coupled to the bottom 49 of the thermal storage unit 36 can be provided. This setup means that only four fluid (e.g., water) connections are performed at installation. These could be load connections 110 for supply and return of the load fluid 22 with the load 14 and tank connections 112 to the top 47 and the bottom 49 of the thermal storage unit 36. The piping for the thermal storage unit 36 may be inexpensive (e.g., plastic) pipe in embodiments with only a low fluid pressure.

Figure 4:
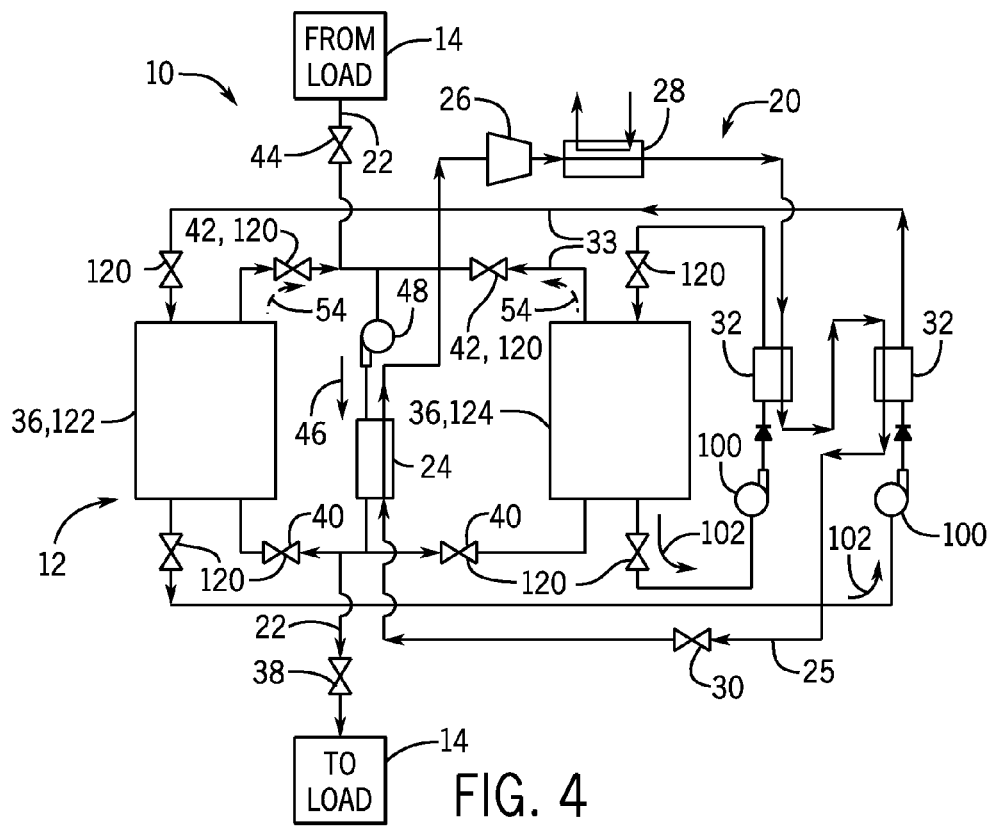
FIG. 4 is a schematic of a cooling system having a subcooling system with thermal storage including multiple cooling fluid tanks, in accordance with embodiments of the present disclosure.

FIG. 4 is an embodiment of the cooling system 10 having the refrigerant circuit 20 and the subcooling system 12, where the subcooling system 12 has multiple thermal storage units 36. More specifically, the illustrated embodiment includes two thermal storage units 36 (e.g., stratified water tanks) and associated valves 120 so that one thermal storage unit 36 can recharge while the other thermal storage unit 36 is supplying the cooling fluid 33 to the one or more subcooling heat exchangers 32. In this manner, the thermal storage units 36 can be continually recharged throughout the day. Furthermore, the illustrated embodiment reduces the size of each thermal storage unit 36, and may increase efficiency of the subcooling system 12. For example, the valves 120 may be controlled so that the cooling fluid 33 is drawn from a first thermal storage unit 122 until the average temperature of the cooling fluid 33 of the first thermal storage unit 122 reaches a subcooler threshold temperature (e.g., temperature of the load fluid 22). Then, the cooling fluid 33 may be drawn from a second thermal storage unit 124 while the cooling fluid 33 of the first thermal storage unit 122 recharges (e.g., cools) via the cooler 24. The valves 120 illustrated in FIG. 4 may include the first, second, third, and fourth valves 38, 40, 42, and 44 described above. The first valve 38 is between the cooler 24 and the load 14, each second valve 40 is between the cooler 24 and a respective thermal storage unit 36, each third valve 42 is between a respective thermal storage unit 36 and the chilled fluid pump 48, and the fourth valve is between the load 14 and the chilled fluid pump 48.

Figure 5:
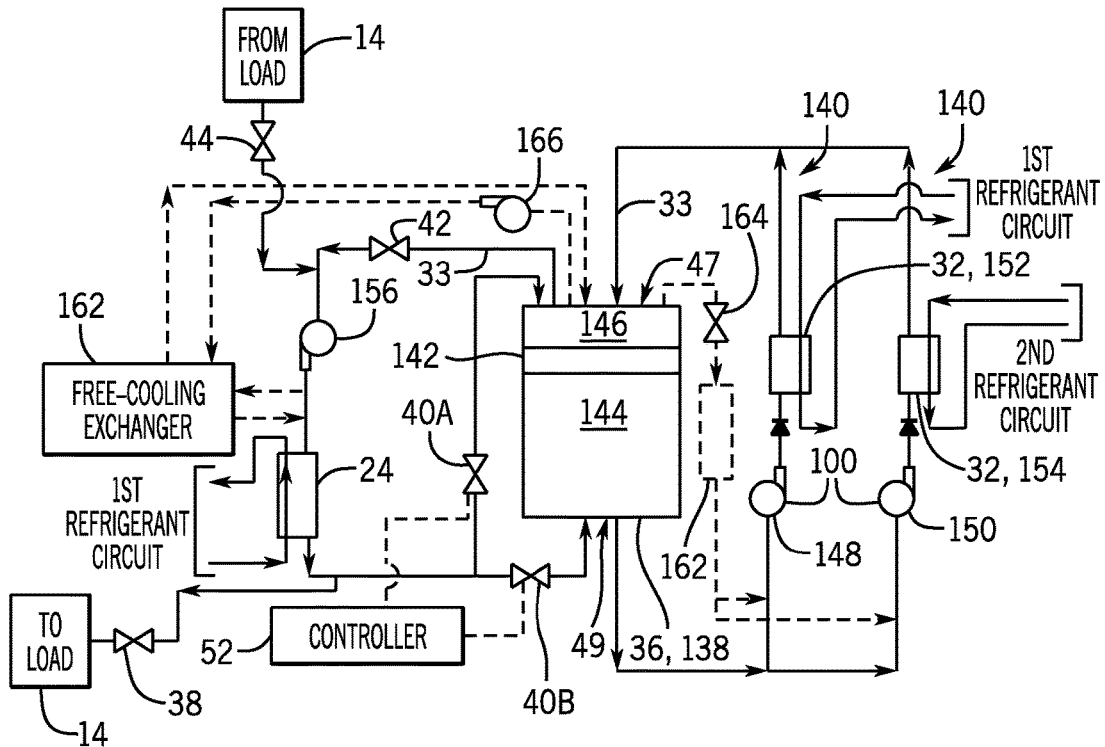
FIG. 5 is a schematic of a cooling system having a subcooling system with thermal storage including a cooling fluid tank with a moveable partition, in accordance with embodiments of the present disclosure.

FIG. 5 is a schematic of an embodiment of the cooling system 10 having at least one refrigerant circuit 20 and the subcooling system 12, wherein the subcooling system 12 includes a stratified fluid tank 138 as the thermal storage unit 36. Specifically, the illustrated embodiment includes two subcooling loops 140 that share the common stratified fluid tank 138. Additionally, the stratified fluid tank 138 includes a moveable partition 142 to separate cold cooling fluid 144 (e.g., cold water) from warm cooling fluid 146 (e.g., warm water) within the thermal storage unit 36. When the subcooling system 12 is configured in the subcooling mode, both subcooling pumps 100 (e.g., a first pump 148 and a second pump 150) may operate to move the cold cooling fluid 144 from the bottom 49 of the stratified fluid tank 138 through each of the subcooling heat exchangers 32 (e.g., a first subcooling heat exchanger 152 and a second subcooling heat exchanger 154). In some embodiments, each subcooling heat exchanger 32 may be fluidly coupled to a separate refrigerant circuit 20 (e.g., first refrigerant circuit, second refrigerant circuit). Alternatively, one or more of the subcooling heat exchangers may be fluidly coupled to a common refrigerant circuit 20, as illustrated in FIG. 4. The subcooling heat exchangers 32 may be coupled to the same or a different refrigerant circuit 20 relative to the refrigerant circuit 20 with the cooler 24 that recharges (e.g., cool) the cooling fluid 33.

When the subcooling system 12 is configured in the recharge mode, a chilled fluid pump 156 may circulate the warm cooling fluid 146 from the top 47 of the stratified fluid tank 138 through the cooler 24, which is part of a refrigerant circuit 20 (e.g., first refrigerant circuit) of the cooling system 10, as described above. The cooling fluid 33 (e.g., water) exiting the cooler 24 is directed to two valves (e.g., a second valve 40A and a second valve 40B). As shown, the second valve 40A directs the cooling fluid 33 to the top 47 of the stratified fluid tank 138 from the cooler 24, and the second valve 40B directs the cooling fluid 33 to the bottom 49 of the stratified fluid tank 138 from the cooler 24. At the beginning of the recharge mode, the second valve 40A is opened and the second valve 40B is closed so that the warm cooling fluid 146 (e.g., warm water) above the partition 142 is cooled first. Once the stratified fluid tank 138 is cooled to the point where the temperature of the cooling fluid 33 (e.g., warm cooling fluid 146) leaving the stratified fluid tank 138 (e.g., out of the top 47 of the stratified fluid tank 138) is near a predetermined value, the second valve 40B is opened to allow cooling fluid 33 (e.g., cold cooling fluid 144) into the bottom 49 of the stratified fluid tank 138 below the partition 142. The second valve 40A and the second valve 40B may be controlled by a programmed automation controller 52, as is the case for other control schemes and processes described herein. Moreover, as described above with FIG. 2, one or more sensors 50 configured to measure operating parameters of the cooling fluid 33 may provide feedback to the controller 52. The controller 52 may utilize the feedback to control the first and second valves 160. When the second valve 40B is opened, the second valve 40A may be closed, which causes the cooling fluid 33 (e.g., warm cooling fluid 146) at the top 47 of the stratified fluid tank 138 to be drained, and the stratified fluid tank 138 to fill with cold cooling fluid 144 at the bottom 49 of the stratified fluid tank 138. Once the stratified fluid tank 138 is filled with cold cooling fluid 144 below the partition 142, the cooler 24 may be shut down as the stratified fluid tank 138 is recharged. The cooler 24 may not be shut down if the cooler 24 is otherwise coupled to a refrigerant circuit 20 configured to cool a load 14.

In certain embodiments, the subcooling system 12 may include a free-cooling heat exchanger. As will be appreciated, in certain environments, such as deserts, ambient air temperatures may be sufficiently low to enable air cooling of the cooling fluid 33 within the thermal storage unit 36 via a free-cooling heat exchanger 162. The free-cooling heat exchanger 162 may be located in addition to or in place of the cooler 24 between the chilled fluid pump 156 and the first and second valves 158, 160. As such, the cooling fluid 33 may be further cooled by ambient air before it enters the cooler 24. Additionally or in the alternative, the same or a different free-cooling heat exchanger 162 may be located in the one or more subcooling loops 140 with the subcooling heat exchangers 152 and 154. In such a configuration, one or more valves 164 may enable pumps 148 and 150 to draw cooling fluid 33 (e.g., warm cooling fluid 146) from the top 47 of the thermal storage unit 36 through the free-cooling heat exchanger 162. Furthermore, a free-cooling heat exchanger 162 may be located in a separate loop with its own pump 166. In such an embodiment, the connections of the separate loop may be positioned near the top 47 of the thermal storage unit 36 so that the separate free-cooling loop cools the warmest fluid (e.g., warm cooling fluid 146) from the thermal storage unit 36.

Figure 6:
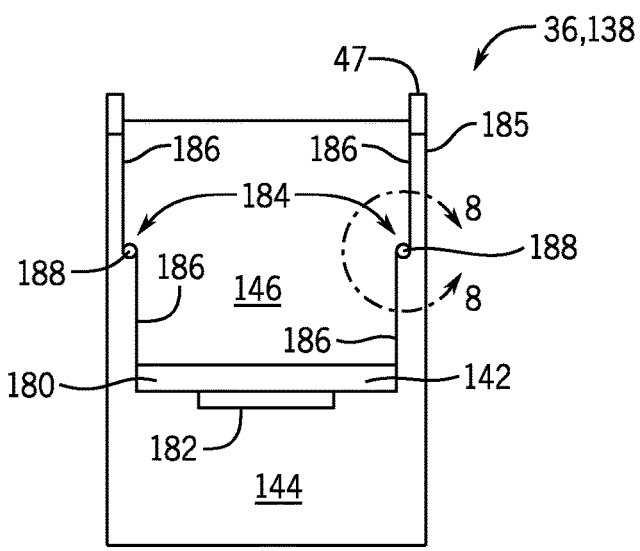
FIG. 6 is a schematic side view of a thermal storage tank of a subcooling system, in accordance with embodiments of the present disclosure.
Figure 7:
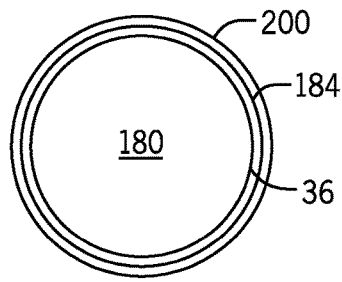
FIG. 7 is a schematic top view of a thermal storage tank of a subcooling system, in accordance with embodiments of the present disclosure.
Figure 8:
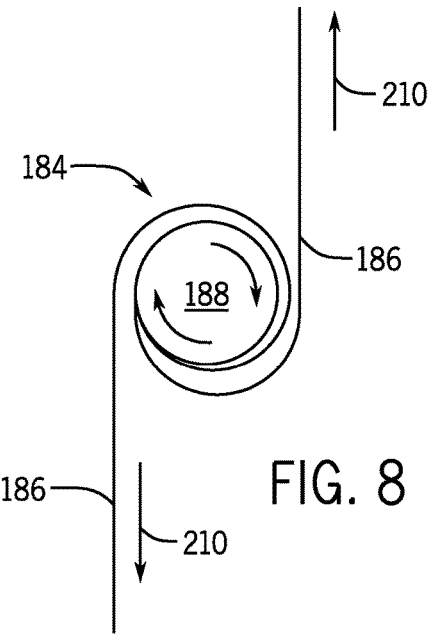
FIG. 8 is a schematic side view of a roller of the thermal storage tank of FIG. 6, in accordance with embodiments of the present disclosure.

FIGS. 6-8 are schematic representations of the thermal storage unit 36 (e.g., stratified fluid tank 138) shown in FIG. 5. For example, FIG. 6 is a side cross-sectional view of the stratified fluid tank 138. Specifically, the illustrated stratified fluid tank 138 is a cylindrical tank having the moveable partition 142 that separates cold cooling fluid 144 and warm cooling fluid 146. The moveable partition 142 may include a thermal insulation layer 180 with a weight 182. As will be appreciated, the weight 182 may give the thermal insulation layer 180 a slightly negative buoyancy relative to the cooling fluid 33. As discussed herein, portions of the cooling fluid 33 may be identified by relative temperature, where a cold cooling fluid 144 has a lower temperature than a warm cooling fluid 146. As may be appreciated, the stratified fluid tank 138 separates the cold cooling fluid 144 from the warm cooling fluid 146. The cold cooling fluid 144 may be utilized with one or more subcooling heat exchangers 32 to subcool a refrigerant 25, where the cooling fluid 33 enters the subcooling heat exchanger 32 as the cold cooling fluid 144 and exits the subcooling heat exchanger 32 as the warm cooling fluid 146. The warm cooling fluid 146 may be cooled during the recharge mode by circulation through the cooler 24 or free-cooling heat exchanger 162, thereby returning the cooling fluid 33 to the thermal storage unit 36 (e.g., stratified fluid tank 138) as cold cooling fluid 144.

The stratified fluid tank 138 further includes a liner 184. More specifically, the liner 184 is an elastic, flexible, and watertight liner 184 that is coupled to the moveable partition 142 and extends upward to the top 47 of the stratified fluid tank 138. The liner 184 is attached to the top 47, to a wall 185 of the stratified fluid tank 138, or to a float. Additionally, the liner 184 has two layers 186 that are rolled up and coupled to one another (e.g., in a toroidal roll 188). For example, one layer 186 may form a flexible tube that is attached to the inside of the stratified fluid tank 138 near the top 47 of the stratified fluid tank 138. The other layer 186 forms another flexible tube that is attached to the circumference of the moveable partition 142 (e.g., thermal insulation layer 180).

FIG. 7 is a top view of the stratified fluid tank 138 of FIG. 5. As shown, the thermal insulation layer 180, the liner 184, and an outer wall 200 of the stratified fluid tank 138 may be generally concentric. Furthermore, FIG. 8 illustrates a cross-sectional view of the toroidal roll 188 formed by the two layers 186 of the liner 184, taken along line 8-8 of FIG. 6. As indicated by arrow 210, each layer 186 of the liner 184 may be in tension. That is, the thermal insulation layer 180 and the weight 182 may apply a tension force on the liner 184. In certain embodiments, the thickness of the liner 184, the diameter of the toroidal roll 188, the diameter of the thermal storage unit 36, and/or the size of the weight 182 may be selected to achieve a desired tension in the liner 184. As may be appreciated, the stratified fluid tank 138 is not limited to a cylindrical tank. In some embodiments, the stratified fluid tank 138 may have other cross-sectional shapes, such as an ellipse, rectangle, pentagon, hexagon, or another shape.

As mentioned above, the illustrated moveable partition 142 creates a fluid-sealed boundary between the cold cooling fluid 144 and the warm cooling fluid 146 within the stratified fluid tank 138. As will be appreciated, such a design may improve control of the partition 142 position. For example, while the weight 182 provides a slightly negative buoyancy on the moveable partition 142, the curl (e.g., the spring force that acts to roll up the toroidal roll 188) of the liner 184 may balance the negative buoyancy caused by the weight 182 when the levels of cold cooling fluid 144 and the warm cooling fluid 146 are approximately equal within the stratified fluid tank 138. Furthermore, in such circumstances, the tension on both sides of the liner 184 may be at equilibrium, such that the moveable partition 142 is relatively stationary. As cooling fluid 33 (e.g., water) is pumped into one side of the thermal storage unit 36 (e.g., the cold cooling fluid 144 side or the warm cooling fluid 146 side), the moveable partition 142 may move in response until approximately equal tension is re-established. The result is that the moveable partition 142 naturally seeks an equilibrium position without any special controls.

In certain embodiments, the illustrated configuration may be applicable to the storage of other liquids, such as gasses, slurries, and other fluid materials in one or more thermal storage units 36. Furthermore, while the embodiment illustrated in FIGS. 6-8 shows one moveable partition 142, other embodiments of the thermal storage unit 36 may have other numbers of moveable partitions 142 within a single tank. For example, the thermal storage unit 36 may include an upper partition and a lower partition. In such an embodiment, the upper partition may have a smaller diameter than the lower partition, and an upper liner for the upper partition may be positioned inside of a lower liner for the lower partition. As a result, the thermal storage unit 36 may have three separate layers or reservoirs of cooling fluid 33. That is, a first reservoir of cooling fluid 33 (e.g., warm water exiting the subcooling heat exchanger 32 at a temperature greater than approximately 60° F.) may be above the upper partition, a second reservoir of cooling fluid 33 (e.g., water at an intermediate temperature between approximately the temperature of the warm water in the first reservoir and the temperature of the cold water in the third reservoir) may be between the upper and lower partitions, and a third reservoir of cooling fluid 33 (e.g., cold water at a temperature between approximately 32 to 50° F.) may be below the lower partition. The temperature of the warm water exiting the subcooling heat exchanger 32 may be approximately the temperature of the refrigerant 25 exiting the condenser 28 or a maximum design temperature of the conduit carrying the warm water, whichever is lower. Furthermore, other embodiments of the thermal storage unit 36 may have more than two partitions.

Figure 9:
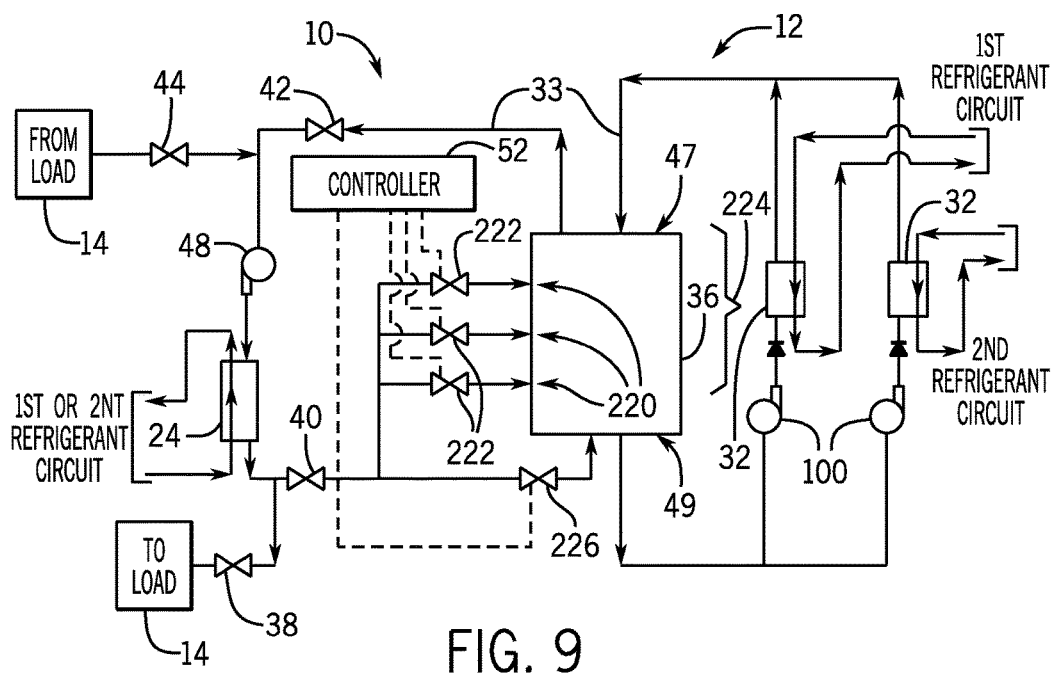
FIG. 9 is a schematic of a cooling system having a subcooling system with thermal storage including a cooling fluid tank with vertically arranged fluid connections, in accordance with embodiments of the present disclosure.

FIG. 9 is a schematic of an embodiment of the cooling system 10 having at least one refrigerant circuit 20 and the subcooling system 12, where the thermal storage unit 36 includes multiple fluid connections 220 arranged vertically across the thermal storage unit 36 (e.g., stratified fluid tank 138). The vertically arranged fluid connections 220 enable only the cooling fluid 33 (e.g., warm water) near the top 47 of the thermal storage unit 36 to be cooled by the cooling fluid 33 that has been recharged (e.g., cooled) by the cooler 24, leaving the cooling fluid 33 (e.g., cold water) at the bottom 49 of the thermal storage unit 36 relatively undisturbed during a recharging mode. The controller 52 may control (e.g., open, close) height valves 222 to inject cooling fluid 33 from the cooler 24 to one or more heights at a top portion 224 where the warm cooling fluid 146 is approximately stratified in the thermal storage unit 36. Once the cooling fluid 33 at the top portion 224 of the thermal storage unit 36 is cooled down to a threshold temperature, cooling fluid 33 (e.g., cold water) from the cooler 24 may be directed to the bottom 49 of the thermal storage unit 36 through a bottom valve 226. As may be appreciated, the cooling system 10 of FIG. 9 may have a similar arrangement of the first, second, third, and fourth valves 38, 40, 42, and 44 as described above with FIG. 3. The first valve 38 is between the cooler 24 and the load 14, the second valve 40 is between the cooler 24 and the thermal storage unit 36, the third valve 42 is between the thermal storage unit 36 and the chilled fluid pump 48, and the fourth valve is between the load 14 and the chilled fluid pump 48.

Figure 10:
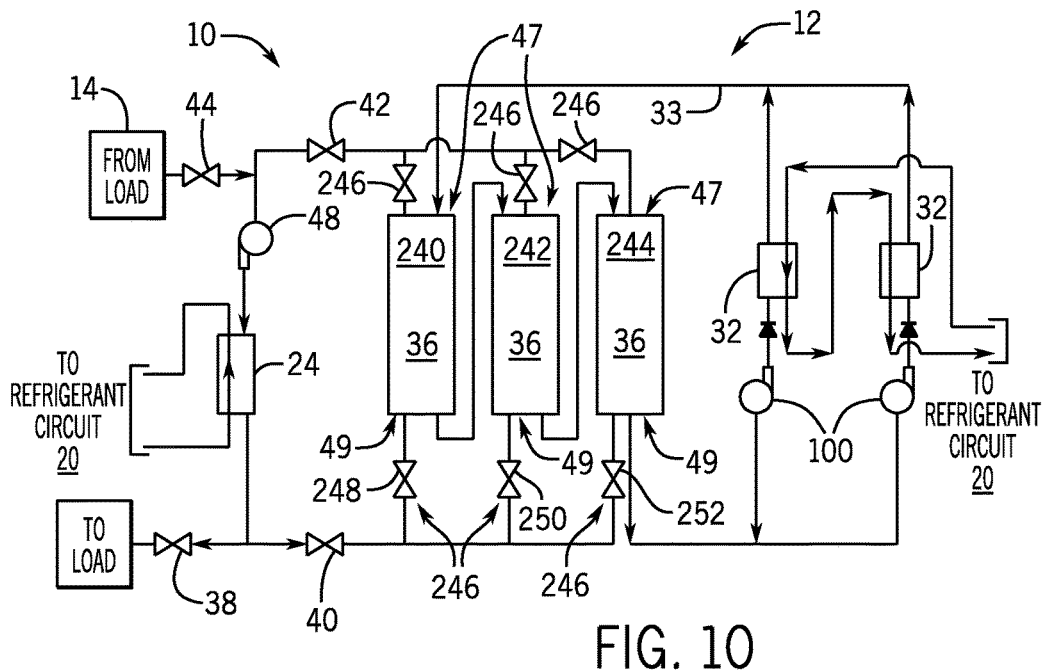
FIG. 10 is a schematic of a cooling system having a subcooling system with thermal storage including multiple cooling fluid tanks arranged in series, in accordance with embodiments of the present disclosure.

FIG. 10 is a schematic of the cooling system 10 having the refrigerant circuit 20 and the subcooling system 12, where the subcooling system 12 includes multiple thermal storage units 36 coupled in series. During a subcooling (e.g., discharge) mode, subcooling pumps 100 circulate cooling fluid 33 from one or more thermal storage units 36 through one or more subcooling heat exchangers 32 of one or more refrigerant circuits 20 to the top 47 of a first thermal storage unit 240 (e.g., a first tank). The cooling fluid 33 may be cold cooling fluid 144 upon entering the subcooling heat exchangers 32, and may exit as warm cooling fluid 146 upon absorbing heat from the refrigerant 25 of the one or more refrigerant circuits 20. In some embodiments, the first, second, and third thermal storage units 240, 242, and 244 may begin operation each substantially filled with cold cooling fluid 144. During the subcooling mode, cold cooling fluid 144 flows from the third thermal storage unit 244 to the one or more subcooling heat exchangers 32, and returns to the first thermal storage unit 240 as warm cooling fluid 146. As may be appreciated, cooling fluid 33 (e.g., cold cooling fluid 144) flows from the second thermal storage unit 242 to the third thermal storage unit 244 to maintain a desired level of cooling fluid 33 (e.g., cold cooling fluid 144) in the third thermal storage unit 244. Likewise, cooling fluid 33 (e.g., cold cooling fluid) flows from the first thermal storage unit 240 to the second thermal storage unit 242 to maintain a desired level of cooling fluid 33 (e.g., cold cooling fluid 144) in the second thermal storage unit 242. The flow rate of cooling fluid between the first, second, and third thermal storage units 240, 242, and 244 may be approximately the same, thereby maintaining the initial volume of cooling fluid 33 within each thermal storage unit. As may be appreciated, the each thermal storage unit may stratify the cooling fluid 33 such that the cold cooling fluid 144 is near the bottom 49 to drain into the next thermal storage unit, and the warm cooling fluid 146 is near the top 47.

The first thermal storage unit 240 fills with warm cooling fluid 146 (e.g., warm water) from the one or more subcooling heat exchangers 32 as the cold cooling fluid 144 (e.g., cold water) drains to the top 47 of the second thermal storage unit 242 from the bottom 49 of the first thermal storage unit 240. When the first thermal storage unit 240 is full of warm cooling fluid 146, additional warm cooling fluid 146 from the one or more subcooling heat exchangers 32 leads warm cooling fluid 146 to flow from the bottom 49 of the first thermal storage unit 240 to the top 47 of the second thermal storage unit 242. Once the second thermal storage unit 242 is full of the warm cooling fluid 146 (e.g., warm water) and substantially empty of the cold cooling fluid 144, additional warm cooling fluid 146 added to the second thermal storage unit 242 leads warm cooling fluid 146 to flow from the bottom 49 of the second thermal storage unit 242 to the top 47 of the third thermal storage unit 244. Therefore, as the cold cooling fluid 144 is sequentially drained from the first, second, and third thermal storage units 240, 242, and 244 to flow through the one or more subcooling heat exchangers 32, warm cooling fluid 146 from the one or more heat exchangers 32 sequentially fills the first, second, and third thermal storage units 240, 242, and 244 during the subcooling mode. Eventually, warm cooling fluid 146 may fill at least a portion of the third thermal storage unit 244 until a recharge mode begins to cool at least a portion of the cooling fluid 33.

As may be appreciated, the cooling system 10 of FIG. 10 may have a similar arrangement of the first, second, third, and fourth valves 38, 40, 42, and 44 as described above with FIG. 3. The first valve 38 is between the cooler 24 and the load 14, the second valve 40 is between the cooler 24 and the thermal storage units 36, the third valve 42 is between the thermal storage units 36 and the chilled fluid pump 48, and the fourth valve is between the load 14 and the chilled fluid pump 48. Valves 246 allow for cooling fluid 33 to bypass one or more of the thermal storage units 240, 242, and 244 during a recharging mode. That is, the cooling fluid 33 of each thermal storage unit 240, 242, and 244 may be recharged separately. For example, if only the first thermal storage unit 240 contains warm cooling fluid, then a fifth valve 248 between the second valve 40 and the first thermal storage unit 240 may open, and sixth and seventh valves 250 and 252 may remain closed so as to allow for cooling/recharging of only the cooling fluid 33 of the first thermal storage unit 240. If the first thermal storage unit 240 is full of warm cooling fluid 146, and the second thermal storage unit 242 is partially full of warm cooling fluid 146, then the fifth valve 248 may be opened first to allow the cooling fluid 33 in the first thermal storage unit 240 to cool down to a temperature near the average temperature of the cooling fluid 33 in the second thermal storage unit 242. Then, the sixth valve 250 between the second valve 40 and the second thermal storage unit 242 may be opened, and the fifth valve 248 may be closed to allow the first thermal storage unit 240 and/or the second thermal storage unit 242 to be cooled or recharged. Similarly, once the first and second thermal storage units 240 and 242 are cooled to a temperature near the average temperature of the cooling fluid in the third thermal storage unit 244, the fifth and sixth valves 248 and 250 may be closed while the seventh valve 252 between the second valve 40 and the third thermal storage unit 244 is opened to allow for cooling or recharging of the third thermal storage unit 244, or each of the first, second, and third thermal storage units 240, 242, and 244. Operation of the valves 246, as discussed above, may be controlled by an automation controller 52 based on measurements from sensors (e.g., temperature sensors and level sensors) positioned in the thermal storage units 240, 242, and 244. In some embodiments, thermal storage units 36 in series may be utilized in a similar manner to a stratified storage tank 138, as described in FIG. 5. That is, separate thermal storage units 36 may be utilized rather than the movable partition 142, where the separate thermal storage units 36 may be used to at least partially separate the warm cooling fluid 146 from the cold cooling fluid 144.

Figure 11:
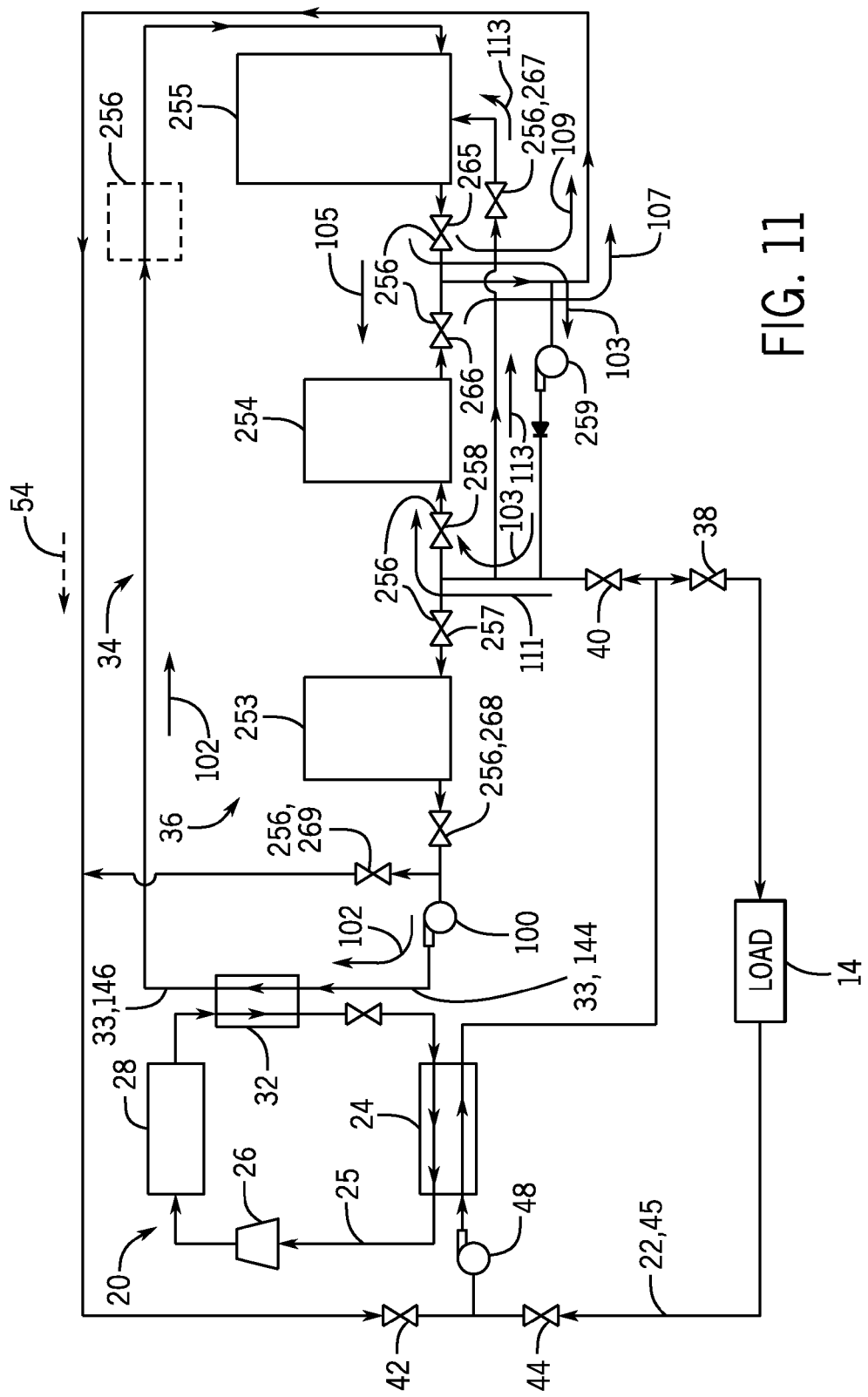
FIG. 11 is a schematic of a cooling system having a subcooling system with thermal storage including multiple cooling fluid tanks, in accordance with embodiments of the present disclosure.

FIG. 11 is a schematic of an embodiment of the cooling system 10 having the refrigerant circuit 20 and the subcooling system 12, where the thermal storage unit 36 of the subcooling system 12 includes multiple tanks to thermally isolate cold cooling fluid 144 from warm cooling fluid 146. The thermal storage unit 36 may include a first tank 253, a second tank 254, and a third tank 255, as well as flow control valves 256 that may be controlled to isolate the cooling fluid 33 flow for each tank. The first, second, and third tanks 253, 254, and 255 may be horizontally arranged, as shown in FIG. 11, or vertically arranged with the third tank 255 above the second tank 254, and the second tank 254 above the first tank 253. In some embodiments, each tank of the first, second, and third tanks 253, 254, and 255 may have a vent to the ambient environment, thereby enabling the cooling fluid 33 within each tank to be at approximately atmospheric pressure. In some embodiments, each tank of the first, second, and third tanks 253, 254, and 255 may be pressurized above atmospheric pressure.

In some embodiments, the flow control valves 256 may be controlled to enable the cooling fluid 33 in the second tank 254 and/or the third tank 255 to be recharged (e.g., cooled) while the first tank 253 supplies cold cooling fluid 144 to the subcooling heat exchanger 32 as shown by arrows 102. The first tank 253 supplies cold cooling fluid 144 to the subcooling pump 100 during operation in a subcooling mode. The cold cooling fluid 144 absorbs heat from the refrigerant 25 in the subcooling heat exchanger 32, thereby exiting the subcooling heat exchanger 32 as warm cooling fluid 146. The warm cooling fluid 146 from the subcooling heat exchanger 32 flows to the third tank 255. Accordingly, during subcooling mode, the first tank 253 has primarily cold cooling fluid 144, and warm cooling fluid 146 is added to the third tank 355. As the cold cooling fluid 144 empties from the first tank 253 via the subcooling pump 100 through the subcooling heat exchanger 32, the first and second control valves 257, 258 may open to fill the first tank 253 with any cold cooling fluid 144 from the second tank 254. The first control valve 257 is between the second valve 40 and the first tank 253, and the second control valve 258 is between the second valve 40 and the second tank 254. The third tank 255 may be approximately 30 to 50 percent larger than either the first tank 253 or the second tank 254. In some embodiments, the volume of cooling fluid in the first, second, and third tanks 253, 254, and 255 may be controlled to enable the total cooling fluid volume may be held within the third tank 255, the subcooling circuit 34, and one of first tank 253 or the second tank 255.

Warm cooling fluid 146 from the third tank 255 may be directed to the second tank 254 as the third tank 255 fills with warm cooling fluid 146 from the subcooling heat exchanger 32. For example, a second control valve 258 and a third control valve 265 may open, the second valve 40 and a fifth control valve 267 may be closed, and a transfer pump 259 may pump at least a portion of the warm cooling fluid 146 from the third tank to the second tank 254, as shown by arrow 103. The third control valve 265 along arrows 103, 105, and 109 between the third tank 255 and the transfer pump 259 or the third valve 42. Additionally, or in the alternative, the third control valve 265 and a fourth control valve 266 may be opened while the third valve 42 is closed to enable at least a portion of the warm cooling fluid 146 from the third tank 255 to the second tank 254, as shown by arrow 105. The fourth control valve 266 is along arrows 103 and 105 between the second tank 254 and the transfer pump 259 or the third valve 42. Accordingly, continued operation in the subcooling mode without recharge may substantially fill the second and third tanks 254, 255 with warm cooling fluid 146, while the first tank 253 is substantially emptied of the cold cooling fluid 144.

As may be appreciated, the cooling system 10 of FIG. 11 may have a similar arrangement of the first, second, third, and fourth valves 38, 40, 42, and 44 as described above with FIG. 3. The first valve 38 is between the cooler 24 and the load 14, the second valve 40 is between the cooler 24 and the thermal storage units 36, the third valve 42 is between the thermal storage units 36 and the chilled fluid pump 48, and the fourth valve is between the load 14 and the chilled fluid pump 48. During a recharge mode, the control valves 256 and the first, second, third, and fourth valves 38, 40, 42, and 44 may be controlled to cool the cooling fluid 33 (e.g., warm cooling fluid 146) in the second tank 254 and the third tank 255 separately. For example, the first and fourth valves 38, 44 may close and the second and third valves 40, 42 may open to fluidly couple the subcooling circuit 34 with the cooler 24. To recharge the cooling fluid of the second tank 254 upon coupling the subcooling circuit 34 with the cooler 24, the second control valve 258 and fourth control valve 266 are opened, and the first, third, and a fifth control valve 257, 265, and 267 are closed to enable the flow shown by arrow 107. The fifth control valve 267 is between the second valve 40 and the third tank 255. Therefore, the cooling fluid 33 of the second tank 254 may be drawn toward the chilled fluid pump 48, as shown by arrow 54, and pumped through the chiller 24 and back to the second tank 254, as shown by arrow 111, to decrease the temperature of the cooling fluid within the second tank 254. During the recharge of the cooling fluid 33 in the second tank 254, the first tank 253 may simultaneously supply cold cooling fluid 144 to the subcooling heat exchanger 32, thereby subcooling the refrigerant 25 and increasing the warm cooling fluid 146 in the third tank 255. When the cooling fluid 33 in the second tank 254 reaches a desired temperature (e.g., temperature of the cold cooling fluid 144), the fourth control valve 266 may be closed, and the first and second control valves 257, 258 are controlled to fill the first tank 253 with the cooling fluid 33 from the second tank 254.

The warm cooling fluid 146 of third tank 255 may be recharged via multiple valve configurations. In some embodiments, at least a portion of the warm cooling fluid 146 of the third tank 255 may be transferred directly to the second tank 254, as discussed above and shown by arrows 103 or 105. The warm cooling fluid 146 received by the second tank 254 may then be recharged as shown by arrows 107, 54, and 111. In some embodiments, the second and third control valves 258, 265 may be opened while the first, fourth, and a fifth control valve 257, 266, 267 are closed, thereby enabling the flow shown by arrow 109. The chilled fluid pump 48 directs the warm cooling fluid 146 from the third tank 255, as shown by arrows 109 and 54, through the cooler 24 and into the second tank 254 as cold cooling fluid 144, as shown by arrow 111. Moreover, in some embodiments, the third control valve 265 and the fifth control valve 267 are opened while the first, second, and fourth control valves 257, 258, and 266 are closed, thereby enabling the flow shown by arrow 109. The chilled fluid pump 48 directs the warm cooling fluid 146 from the third tank, as shown by arrows 109 and 54, through the cooler 24 and into the third tank 255 as cold cooling fluid 144, as shown by arrow 113. Any of the above valve configurations may be utilized to cool the warm cooling fluid 146 of the third tank 255. In some embodiments, cold cooling fluid 144 from the first tank 253 may not flow through the subcooling heat exchanger 32, such as by closing a sixth control valve 268 between the first tank 253 and the subcooling pump 100, thereby reducing the warm cooling fluid 146 added to the third tank 255 while the third tank 255 is recharged. Additionally, or in the alternative, a seventh control valve 269, located between the sixth control valve 268 and the third valve 42, may be opened to enable cold cooling fluid 144 from the first tank 253 to be directed through the cooler 24 with the warm cooling fluid 146. Accordingly, the temperature of the cooling fluid 33 in the third tank 255 may be decreased to a desired temperature (e.g., temperature of the cold cooling fluid 144).

In some embodiments, the cooling fluid 33 of the third tank 255 may be cooled while subcooling the refrigerant 25 without adding warm cooling fluid 146 to the cooling fluid 33 that is being cooled in the third tank 255. For example, a fourth tank 270 may receive the warm cooling fluid 146 from the subcooling heat exchanger 32 while the third tank 255 is recharged. In another embodiment, the third tank 255 may be a stratified fluid tank with a partition as described above, thereby enabling the warm cooling fluid 146 entering the third tank 255 to be separated from the cooling fluid 33 being recharged. In another embodiment, the subcooling heat exchanger 32 may not receive cold cooling fluid 144 from the first tank 253 while recharging the third tank 255. Accordingly, the first, second, and third tanks 253, 254, and 255 may be utilized to reduce or eliminate mixing of cold cooling fluid 144 with warm cooling fluid 146 within any particular tank.

Figure 12:
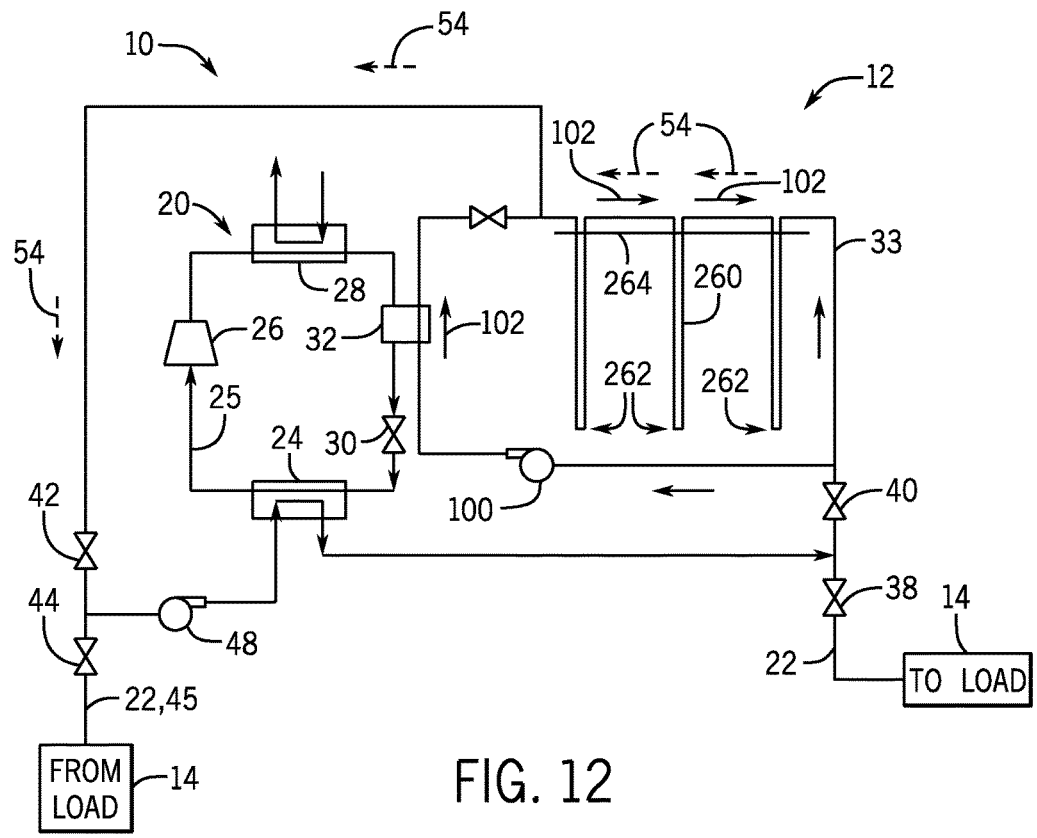
FIG. 12 is a schematic of a cooling system having a subcooling system with thermal storage including multiple subterranean fluid storage loops, in accordance with embodiments of the present disclosure.

FIG. 12 is a schematic of an embodiment of the cooling system 10 having the refrigerant circuit 20 and the subcooling system 12, where the thermal storage unit 36 does not include a tank. More specifically, the thermal storage unit 36 in the illustrated embodiment includes a ground loop 260 (e.g., a subterranean conduit or conduit below a surface 264 of the earth which carries the cooling fluid 33). In certain embodiments, the ground loop 260 may thermally isolate warm cooling fluid 146 and cold cooling fluid 144 to improve thermal storage capability. For example, the ground loop 260 may include a horizontal loop or multiple vertical loops 262 in series to help thermally isolate warm cooling fluid 146 and cold cooling fluid 144. As may be appreciated, the cooling system 10 of FIG. 12 may have a similar arrangement of the first, second, third, and fourth valves 38, 40, 42, and 44 as described above with FIG. 3. The first valve 38 is between the cooler 24 and the load 14, the second valve 40 is between the cooler 24 and the ground loop 260, the third valve 42 is between the ground loop 260 and the chilled fluid pump 48, and the fourth valve is between the load 14 and the chilled fluid pump 48.

Figure 13:
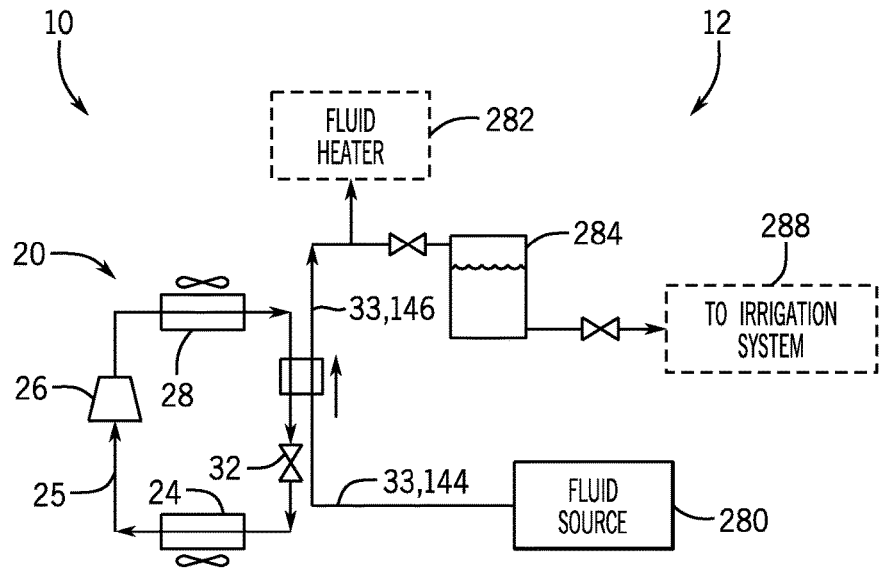
FIG. 13 is a schematic of a cooling system having a subcooling system with thermal storage including a single pass cooling fluid system, in accordance with embodiments of the present disclosure.

FIG. 13 is a schematic of an embodiment of the cooling system 10 having the refrigerant circuit 20 and the subcooling system 12, where the subcooling system 12 is a "once-through" system. In other words, the illustrated embodiment of the subcooling system 12 directs a cooling fluid 33 (e.g., water) through the subcooling system 12 once, and the cooling fluid 33 is not necessarily re-circulated. For example, the cooling fluid 33 (e.g., water) may be supplied by a fluid source 280, such as ground water or municipal water. The cooling fluid 33 exiting the subcooling heat exchanger 32 as warm cooling fluid 146 may be used for other applications. For example, the warm cooling fluid 146 may flow to a water heater 282 to heat further or to preheat water, to a reservoir 284 for present or future use with an irrigation system 286, or other uses. As will be appreciated, the illustrated embodiment may be particularly applicable in environments or locations where a fluid source of cold cooling fluid 144, such as cool ground water, is available and/or abundant.

Figure 14:
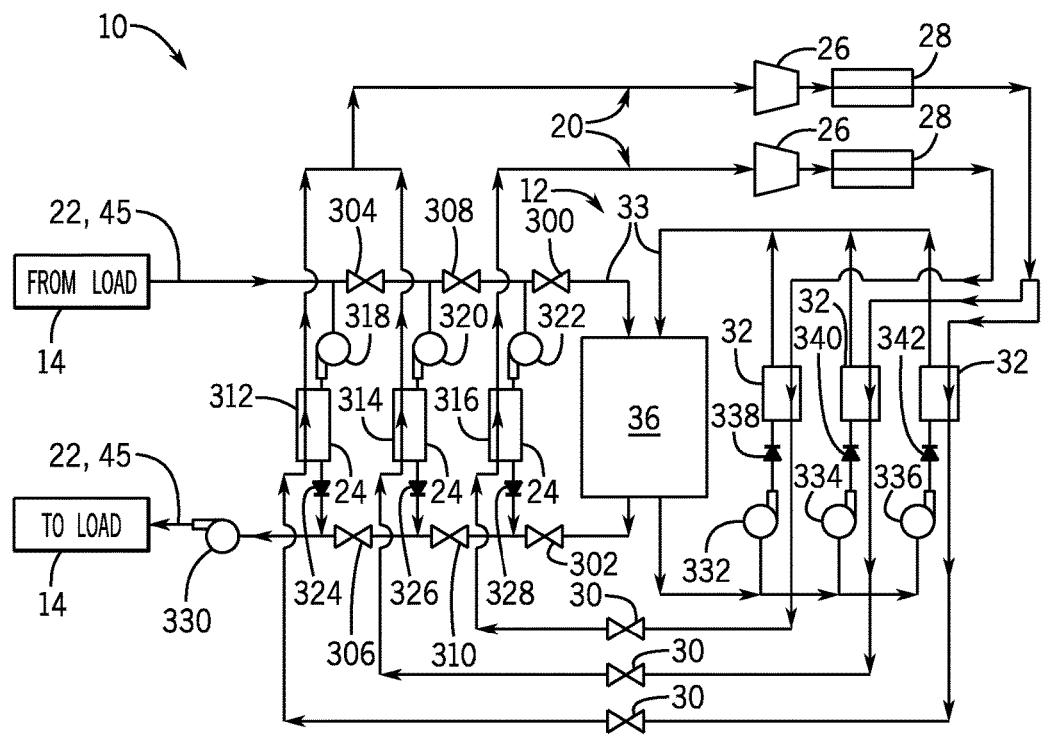
FIG. 14 is a schematic of a cooling system having a subcooling system with thermal storage including multiple coolers and subcoolers arranged in parallel, in accordance with embodiments of the present disclosure.

FIG. 14 is a schematic of an embodiment of the cooling system 10 having the multiple refrigerant circuits 20 and the subcooling system 12. The multiple refrigerant circuits 20 has multiple coolers 24, and the subcooling system 12 has multiple subcooling heat exchangers 32. In some embodiments, the coolers 24 may be fluidly coupled in the respective one or more refrigerant circuits 20 in a parallel configuration, as shown by coolers 312 and 314. Additionally, or in the alternative, the subcooling heat exchangers 32 may be coupled in the respective one or more refrigerant circuits 20 in a parallel configuration, as shown by subcooling heat exchangers 340 and 342. As may be appreciated, the coolers 24 and subcooling heat exchangers 32 may be fluidly coupled to the one or more refrigerant circuits 20 and/or to the subcooling system 10 in various configurations. Accordingly, the cooling system 10 may have additional flexibility in connecting different subcooling heat exchangers 32 to the thermal storage unit 36 for subcooling the refrigerant 25, additional flexibility in connecting different coolers 24 to the load 14 for cooling the load 14, and/or additional flexibility in connecting different coolers 24 to the thermal storage unit 36 for recharging the cooling fluid 33.

For example, if valves 300 and 302 are closed and valves 304, 306, 308, and 310 are opened, then each of the coolers 312, 314, and 316 is coupled to the load 14 to cool the load fluid 22, and each of the coolers 312, 314, and 316 is isolated from the thermal storage unit 36. As shown, each of the coolers 312, 314, and 316 has a corresponding load pump 318, 320, and 322, respectively, and a corresponding check valve 324, 326, and 328, respectively, to provide a fluid (e.g., load fluid 22, cooling fluid 33) flow through each cooler 312, 314, and 316. Additionally, a supply pump 330 may move load fluid 22 to the load 14. Subcooling pumps 332, 334, and 336 pump cooling fluid 33 (e.g., water) from the thermal storage unit 36 to the subcooling heat exchangers 32, which are in refrigerant circuits 20 with the coolers 312, 314, and 316 as discussed above. For example, the subcooling pump 332 may supply cooling fluid 33 to a subcooling heat exchanger 32 that is fluidly coupled to the cooler 316, the subcooling pump 334 may supply cooling fluid 33 to a subcooling heat exchanger 32 that is fluidly coupled to the coolers 314 and 312, and the subcooling pump 336 may supply cooling fluid 33 to a subcooling heat exchanger 32 that is fluidly coupled to the coolers 314 and 316. In certain embodiments, check valves 338, 340, and 342 may also be included with the subcooling loops.

The cooling system 10 illustrated in FIG. 14 may enable the cooling fluid 33 of the thermal storage unit 36 to be simultaneously recharged via one or more coolers 312, 314, and 316 while subcooling the refrigerant 25 of one or more refrigerant circuits 20 via one or more subcooling heat exchangers 32. In other words, the cooling system 10 may operate in the recharge mode and subcooling mode at the same time. In the illustrated embodiment, the thermal storage unit 36 (e.g., water tank) may be recharged using cooler 316 by closing valves 308 and 310 and opening valves 300 and 302, thereby isolating the thermal storage unit 36 from the coolers 312 and 314. As will be appreciated, to provide pressure isolation, valves 308 and 310 should be closed before valves 300 and 302 are opened. This configuration allows for cooler 316 to cool the cooling fluid 33 (e.g., water) in the thermal storage unit 36 while coolers 312 and 314 supply load fluid 22 (e.g., chilled water) to the load 14.

Similarly, valves 304 and 306 can be closed while valves 300, 302, 308, and 310 are opened, thereby isolating the thermal storage unit 36 from the cooler 312. In such a configuration, coolers 314 and 316 may cool the cooling fluid 33 in the thermal storage unit 36, while cooler 312 supplies load fluid 22 (e.g., chilled water) to the load 14.

Figure 15:
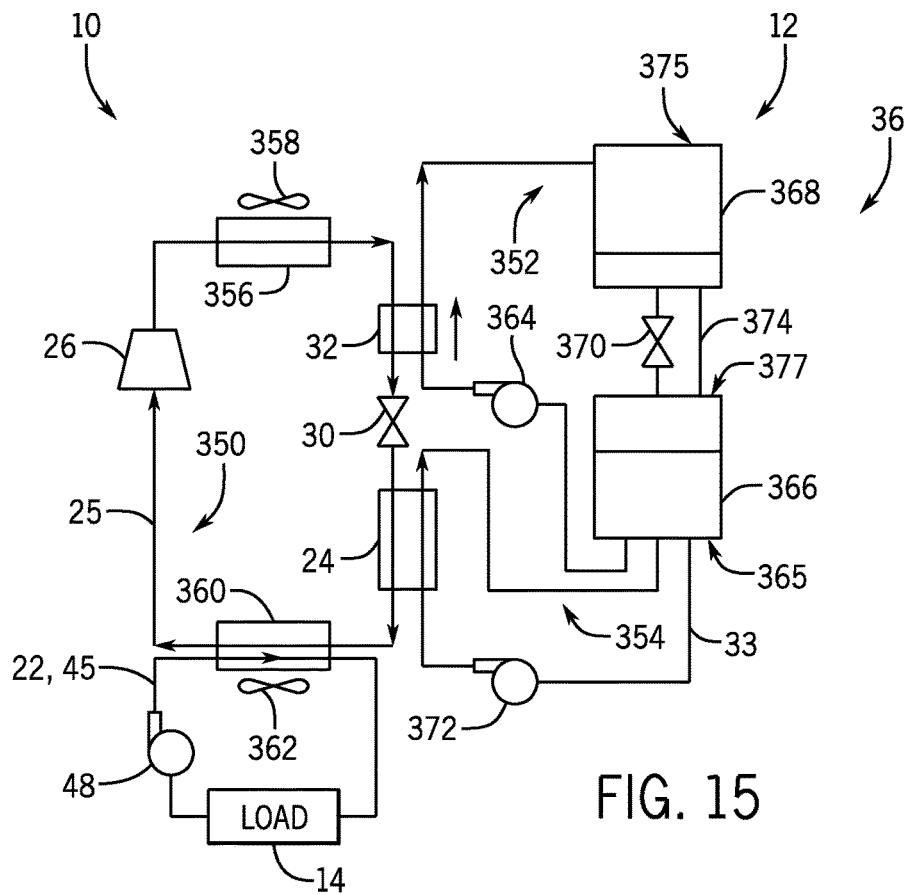
FIG. 15 is a schematic of a cooling system having a subcooling system with thermal storage including two vertically arranged cooling fluid tanks, in accordance with embodiments of the present disclosure.

FIG. 15 is a schematic of an embodiment of the cooling system 10 having a refrigerant loop 350 and the subcooling system 12, where the subcooling system 12 may be suitable for trans-critical operation of the refrigerant 25 through the refrigerant loop 350. As may be appreciated, a trans-critical process may cool the refrigerant 25 to a subcooled (e.g., liquid) state, and may heat and/or pressurize the refrigerant 25 to a supercritical state where liquid and gas phases of the refrigerant 25 are indistinguishable. For example, in the illustrated embodiment, the cooling system 10 has a refrigerant loop 350, and the subcooling system 12 has a first cooling fluid (e.g., water) loop 352 and a second cooling fluid (e.g., water) loop 354. Similar to the refrigerant circuit 20 described above, the refrigerant loop 350 circulates a refrigerant 25 (e.g., carbon dioxide, R134a, R410A, R32, R1233ZD(E), R1233zd (E), R1234yf, R1234ze) and includes the cooler 24, the compressor 26, the subcooling heat exchanger 32, and the expansion device 30. The cooler 24 may be utilized to recharge the cooling fluid 33 (e.g., water) of the thermal storage unit 36. The illustrated refrigerant loop 350 includes a condenser coil 356 as the condenser 28, and a condenser fan 358 is configured to move air over the condenser coil 356, thereby cooling the refrigerant 25. The refrigerant loop 350 also includes an evaporator coil 360, in which the refrigerant 25 absorbs heat and at least partially evaporates. In some embodiments, the load fluid 22 (e.g., return water 45) from the load 14 circulates through the evaporator 360 to transfer heat to the refrigerant 25. An evaporator fan 362 may be configured to move air over the evaporator coil 360, thereby cooling the air and transferring heat to the refrigerant 25. In some embodiments, the air moving over the evaporator coil 360 is the load, such as in a refrigeration system.

A first cooling fluid loop 352 may subcool the refrigerant 25 of the refrigerant loop 350 via the subcooling heat exchanger 32. For example, the first cooling fluid loop 352 supplies the cooling fluid 33 (e.g., cold water) from a lower tank 366 to the subcooling heat exchanger 32 and to an upper tank 368 via a first pump 364. A second cooling fluid loop 354 may be cool (e.g., recharged) via circulation through the cooler 24. For example, the second cooling fluid loop 354 supplies the cooling fluid 33 (e.g., water) from the lower tank 366 to the cooler 24, and back to the lower tank 366. The thermal storage unit 36 may include the lower tank 366 and the upper tank 368, where the upper tank 368 is arranged vertically above the lower tank 366. Specifically, the first cooling fluid loop 352 includes a first pump 364 configured to pump the cooling fluid 33 through the first cooling fluid loop 352. That is, the first pump 364 draws the cooling fluid 33 from a bottom 365 of the lower tank 366 of the thermal storage unit 36, pumps the cooling fluid 33 through the subcooling heat exchanger 32, and discharges the warmed cooling fluid 33 into the upper tank 368 of the thermal storage unit 36. A valve 370 is located between the lower tank 366 and the upper tank 368 to complete the first cooling fluid loop 352. Similarly, the second cooling fluid loop 354 includes a second pump 372 configured to pump the cooling fluid 33 through the second cooling fluid loop 354. Specifically, the second pump 372 draws cooling fluid 33 (e.g., water) from the bottom 365 of the lower tank 366, pumps the cooling fluid 33 through the cooler 24, and discharges the cooling fluid 33 back into the lower tank 366.

During a discharge (e.g., cooling) mode of the illustrated embodiment, the refrigerant 25 in the evaporator 360 absorbs heat from the load 14. The compressor 26 increases the pressure of the refrigerant 25 and directs the refrigerant 25 through the condenser 356 to reject heat to the air drawn by the condenser fan 358. The first pump 364 moves cold cooling fluid 144 (e.g., cold water) from the bottom 365 of the lower tank 366, through the subcooling heat exchanger 32, and into the upper tank 368, thereby further cooling the refrigerant 25 before expansion by the expansion device 30. An air vent 374 of the thermal storage unit 36 enables air to move freely from a top 375 of the upper tank 368 to a 377 top of the lower tank 366, such that the level of the cold cooling fluid 144 in the lower tank 366 drops as the first pump 364 fills the upper tank 368 with warm cooling fluid 146 from the subcooling heat exchanger 32.

At the beginning of the recharge mode of the illustrated embodiment, the valve 370 may open between the upper tank 368 and the lower tank 366, thereby enabling warm cooling fluid 146 from the upper tank 368 to drain to the lower tank 366. During the recharge mode, the refrigerant 25 through the refrigerant loop 350 may be utilized to primarily cool the cooling fluid 33 through the cooler 24 rather than to remove heat from the load 14. For example, as the warm cooling fluid 146 drains, the evaporator fan 362 may be turned off, and the second pump 372 may be turned on to move warm cooling fluid 146 from the lower tank 366, through the cooler 24, and back to the lower tank 366, thereby reducing the temperature of the cooling fluid 33 within the lower tank 366. In some embodiments, the first pump 364 may continue to direct cooling fluid 33 through the first cooling fluid loop 352 and the subcooling heat exchanger 32 during the recharge mode, thereby sending warm cooling fluid 146 to the upper tank 368. Upon draining a desired amount (e.g., 25, 50, 75, 100 percent) of the warm cooling fluid 146 from the upper tank 368, the valve 370 may be closed, and the warm cooling fluid 146 leaving the subcooling heat exchanger 32 may then accumulate in the upper tank 368 during the remainder of the recharge process. Once the lower tank 366 is cooled to a desired minimum temperature by circulating the cooling fluid through the second cooling fluid loop 354, the recharging process may be complete. Upon completion of the recharging process, a majority of the cooling fluid 33 may be in the lower tank 366 as cold cooling fluid 144, with the remainder of the cooling fluid 33 being warm cooling fluid 146 in the upper tank 368.

As will be appreciated, the operation of the cooling system 10 and the subcooling system 12 in discharge or recharge mode may depend on various factors. For example, for systems where thermal storage is lower priority, the sizes of the upper and lower tanks 368 and 366 may be relatively small, thereby enabling the cooling system 10 to operate in the discharge mode for a brief time (e.g., approximately 1 hour or less). In such circumstances, it may be desirable to initiate a recharge mode when the cooling fluid level in the lower tank 366 reaches a minimum value. However, in embodiments where thermal storage is higher priority, the upper and lower tanks 368 and 366 may be relatively large and may be able to operate in a discharge mode for several hours without recharging. In such circumstances, the recharge mode may be initiated at night or other times when energy rates are reduced.

Furthermore, in certain embodiments, as discussed above, the thermal storage unit 36 may include a single tank (e.g., stratified fluid tank 138). As will be appreciated, such embodiments may utilize less space and may have lower initial equipment costs. In a single tank embodiment, the first cooling fluid loop 352 may discharge cooling fluid back to the top of the lower tank 366, such as above a moveable partition.

Figure 16:
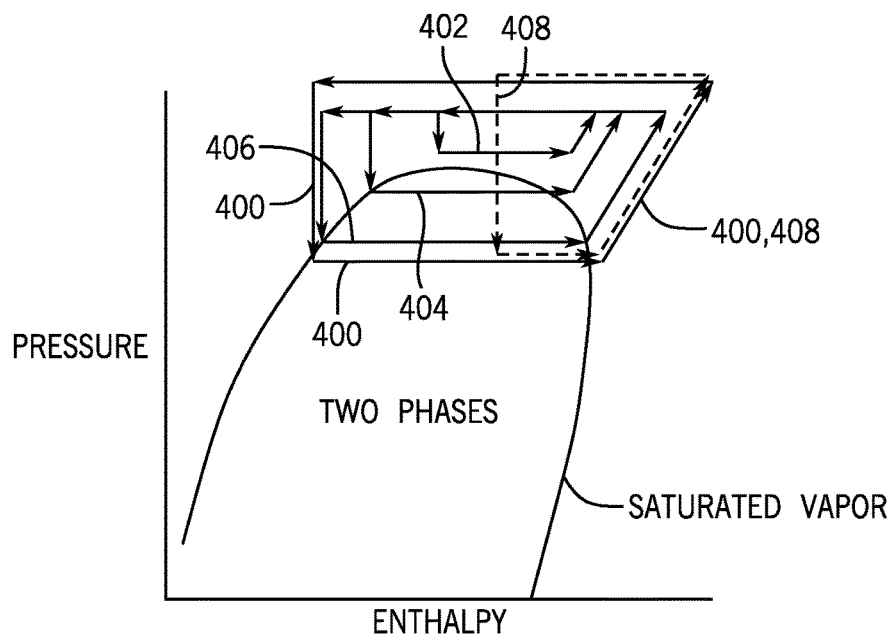
FIG. 16 is a pressure-enthalpy diagram for the cooling system of FIG. 15, in accordance with embodiments of the present disclosure.

FIG. 16 is a schematic pressure-enthalpy diagram for the refrigerant 25 of the refrigerant loop 350 in the cooling system shown in FIG. 15. Specifically, loop 400 shows pressure and enthalpy of the refrigerant 25 of the refrigerant loop 350 when the cooling system 10 is operating in a discharge mode, where the subcooling system 12 cools the refrigerant 25 via the subcooling heat exchanger 32. Moreover, loop 402 illustrates the pressure and enthalpy of the refrigerant 25 of the refrigerant loop 350 when the cooling system 10 is beginning to recharge the cooling fluid 33 of the subcooling system 12. As shown by loop 402, the refrigerant 25 may remain gaseous (e.g., outside the saturated vapor curve) throughout the loop 402. Loop 404 illustrates the pressure and enthalpy of the refrigerant 25 of the refrigerant loop 350 during a middle of the recharge of the cooling fluid 33 of the subcooling system 12, where the refrigerant 25 may change phases within the loop 404. Loop 406 illustrates the pressure and enthalpy of the refrigerant 25 of the refrigerant loop 350 near an end of the recharge of the cooling fluid 33 of the subcooling system 12. For comparison, loop 408 illustrates a conventional trans-critical vapor compression cycle without the subcooling system 12.

As will be appreciated, the cooling system 10 with the refrigerant loop 350 and the subcooling system 12 illustrated in FIG. 15 may reduce losses associated with the expansion process. More specifically, during the discharge mode the cooling fluid 33 of the subcooling system 12 may be used to cool the trans-critical refrigerant fluid 25 of the refrigerant loop 350 via the subcooling heat exchanger 32 to a temperature that is near the evaporating temperature of the trans-critical refrigerant 25. The energy in the cooling fluid 33 is then rejected to the refrigerant 25 via the cooler 24 during the recharge mode, and the refrigerant 25 rejects the heat to the air via the condenser 356. Furthermore, the upper and lower tank 368 and 366 configuration of the embodiment shown in FIG. 15 may be incorporated with other embodiments described herein.

In the case of trans-critical operation there is no phase change (e.g., gas to liquid) in the condenser 356, and the subcooler 32 cools a trans-critical refrigerant 25 instead of subcooling a condensed liquid refrigerant. That is, the liquid cooling fluid may cool the trans-critical refrigerant fluid 25 in the subcooler 32. In addition it is possible to operate the evaporator 360 and the expansion device 30 when the temperature of the evaporator 360 exceeds the critical temperature of the refrigerant 25. Loop 402 in FIG. 16 is an example of this extreme operating condition where the refrigerant 25 does not condense. Therefore the names of the components (e.g., evaporator 360, condenser 356) are intended to broadly include operation at conditions that exist at or above the refrigerant critical point.

Figure 17:
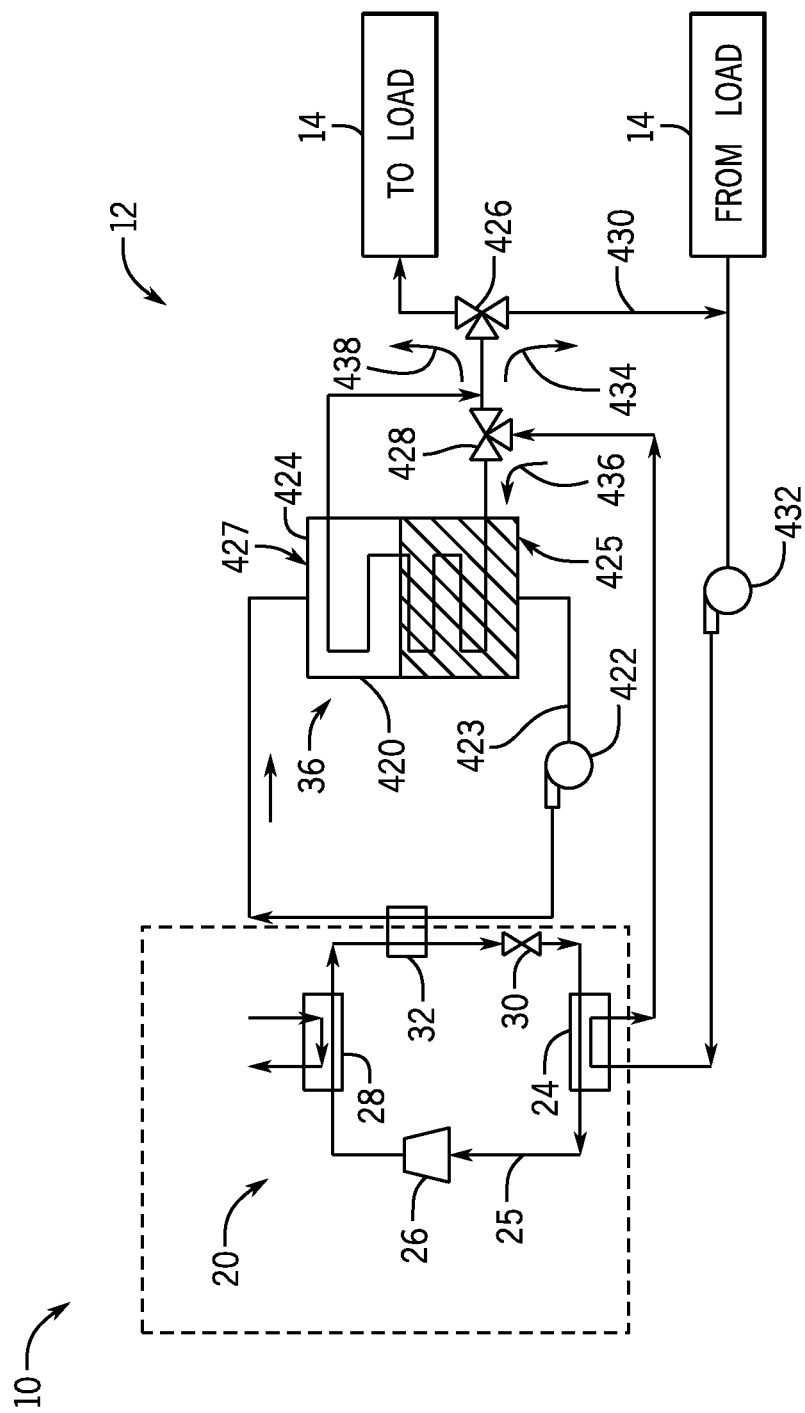
FIG. 17 is a schematic of a cooling system having a subcooling system with thermal storage including an ice storage tank, in accordance with embodiments of the present disclosure.

FIG. 17 is a schematic of an embodiment of the cooling system 10 having the refrigerant circuit 20 and the subcooling system 12, where the subcooling system 12 utilizes ice storage. In this embodiment, melted water from an ice storage tank 420 (e.g., thermal storage unit 36) is used for subcooling. Specifically, a subcooling pump 422 moves cold water 423 from a bottom 425 of the ice storage tank 420, through the subcooling heat exchanger 32, and back to a top 427 of the ice storage tank 420. In certain embodiments, the flow rate of the subcooling pump 422 may be selected to create a stratified ice storage tank. That is, the flow rate may be slow so as to preserve the stratification of the ice storage tank 420. Additionally, a glycol solution or other anti-freeze liquid may be circulated through coils 424 in the ice storage tank 420 to produce ice. Specifically, valves 426 and 428 may be configured to regulate the glycol or other anti-freeze liquid flow.

During a recharge mode, valve 426 between the ice storage tank 427 and a glycol pump 423 closes glycol flow to the load 14 and directs it to a bypass line 430 and to the glycol pump 432, as indicated by arrow 434. Additionally, in the recharge mode, valve 428 between the cooler 24 and the ice storage tank 427 directs glycol through the coils 424 in the ice storage tank 420, as indicated by arrow 436. The recharge mode may freeze the cold water 423 to ice. In a discharge mode (e.g., cooling using melted ice water 423), the valve 426 is open to the load 14 and closed to the bypass line 430, as indicated by arrow 438. Additionally, valve 428 remains open to the coils 424 in the ice storage tank 420. Once the ice in the ice storage tank 420 has melted, valve 428 closes glycol flow to the coils 424 in the ice storage tank 420. At this point, the subcooling pump 422 can be operated to provide additional cooling (e.g., to the subcooling heat exchanger 32) using cold water (e.g., melted ice water 423) from the bottom of the ice storage tank 420, in the manner described above.

Figure 18:
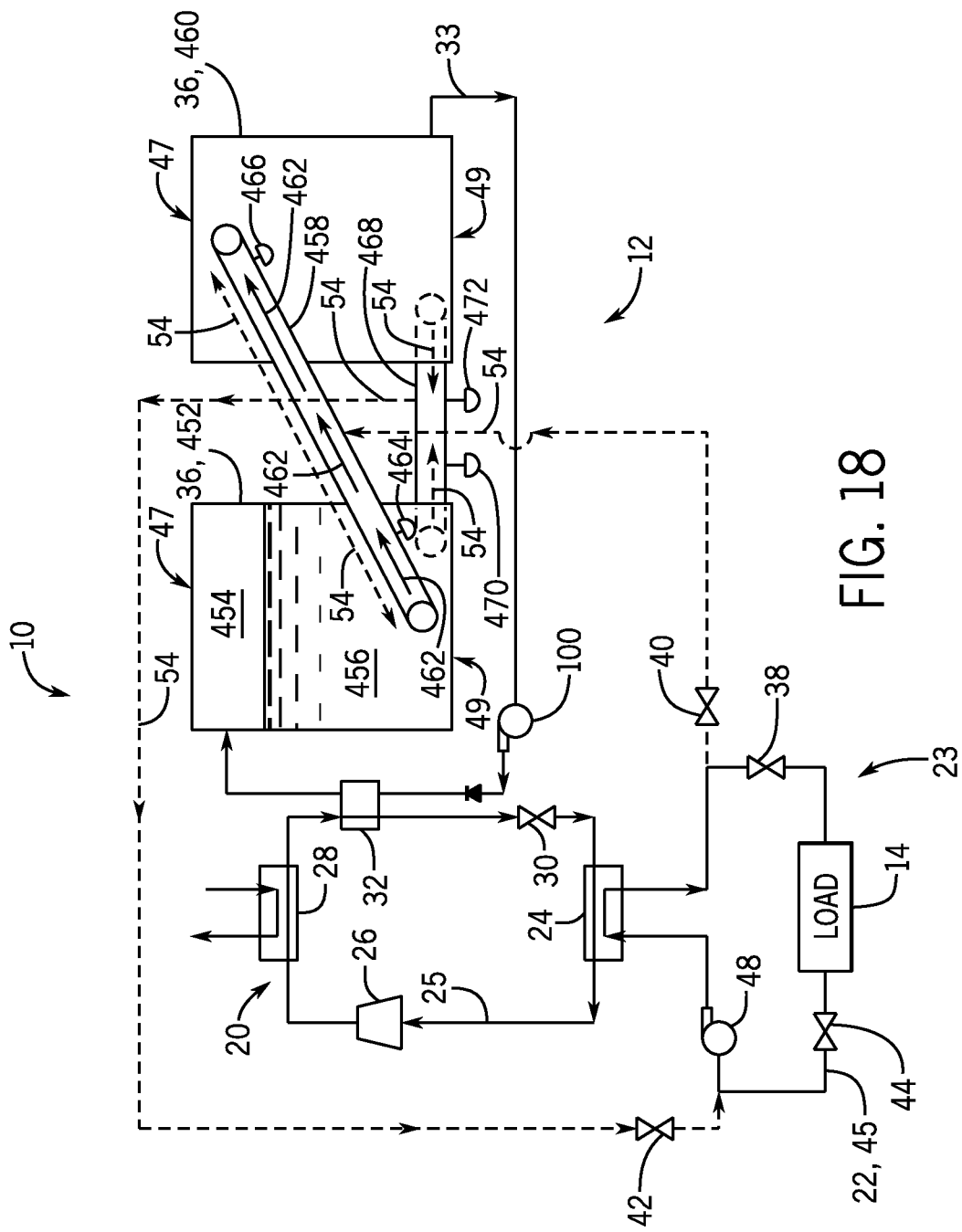
FIG. 18 is a schematic of a cooling system having a subcooling system with thermal storage tanks coupled in series, in accordance with embodiments of the present disclosure.

FIG. 18 is a schematic of an embodiment of the cooling system 10 having the refrigerant circuit 20 and the subcooling system 12, where the subcooling system 12 has two thermal storage units 36 connected in parallel during recharge mode and connected in series in subcooling mode. In the subcooling mode, warm cooling fluid 450 from the subcooling heat exchanger 32 enters near the top 47 of a first thermal storage unit 452 at a low flow rate to enable stratification of the cooling fluid 33 into a warm layer 454 and a cool layer 456. Cold cooling fluid 33 exits the first thermal storage unit 452 near the bottom 49 of the first thermal storage unit 452 through an inclined pipe 458 and enters the second thermal storage unit 460 near the top 47, as shown by the solid arrows 462. Cold cooling fluid 33 exits near the bottom 49 of the second thermal energy storage unit 404 to the subcooling pump 100. The conduits carrying the cooling fluid 33 during the subcooling mode are sized to enable the stratification of the first and the second thermal energy storage units 452, 460 via a relatively low flow rate. The arrangement of the inclined pipe 458 fluidly couples the first and second thermal storage units 452, 460 in series during the subcooling mode without utilizing valves to control the flow between the first and second thermal storage units 452, 460.

In the recharge mode, cooling fluid 33 flows from the first and/or the second thermal storage units 452, 460 as shown by the dashed arrows 54. Chilled cooling fluid 33 from the cooler 24 enters through the inclined pipe 458 and may split to flow to flow into the first and the second thermal energy storage units 452 and 460. A first recharge valve 464 coupled to the first thermal storage unit 452 may control the recharged (e.g., chilled) flow of cooling fluid 33 into the first thermal storage unit 452, and a second recharge valve 466 coupled to the second thermal storage unit 460 may control the recharged (e.g., chilled) flow of cooling fluid 33 into the second thermal storage unit 460. As may be appreciated, the chilled fluid pump 48 may direct the recharged chilled fluid 33 into the first and second thermal storage units 452, 460 at a higher flow rate than the subcooling pump 100, thereby mixing the cooling fluid within the first and second thermal storage units 452, 460 during the recharge mode. Cooling fluid 33 exits the first and second thermal storage units 452, 460 through a conduit 468, and the chilled fluid pump 48 directs the combined cooling fluid flow through the chiller 24. A third recharge valve 470 coupled to the first thermal storage unit 452 may control the flow of cooling fluid 33 from the first thermal storage unit 452 to the chilled fluid pump 48, and a fourth recharge valve 472 coupled to the second thermal storage unit 460 may control the flow of cooling fluid 33 from the second thermal storage unit 460 to the chilled fluid pump 48. The first, second, third, and fourth recharge valves 464, 466, 470, and 472 may be selectively opened and closed to recharge the first thermal storage unit 452 and the second thermal storage unit 460 at the same time. Additionally, or in the alternative, the first, second, third, and fourth recharge valves 464, 466, 470, and 472 may be selectively opened and closed to recharge only the first thermal storage unit 452 or only the second thermal storage unit 460. While the first and second recharge valves 464, 466 are shown on the inclined pipe 458, it may be appreciated that other arrangements of the first and second recharge valves 464, 466, such as within the respective first and second thermal storage units 452, 460, may enable the recharge of one or both of the thermal storage units 452, 460. Likewise, while the third and fourth recharge valves 470, 472 are shown on the conduit 468, it may be appreciated that other arrangements of the third and fourth recharge valves 464, 466, such as within the respective first and second thermal storage units 452, 460, may enable the recharge of one or both of the thermal storage units 452, 460. The first, second, third, and fourth recharge valves 464, 466, 470, and 472 may be include, but are not limited to butterfly valves. Similar configurations of recharge valves, inclined pipes, and conduits can be extended to more than two thermal storage units.

In some embodiments, the conduit 468 may be coupled between the first thermal storage unit 452 and the second thermal storage unit 460 in a similar manner as the inclined pipe 458. That is, the conduit 468 may form a substantially parallel pathway to the inclined pipe 458 in which a first end of the conduit 468 is coupled near the bottom 49 of the first thermal storage unit 452 and an opposite second end of the conduit 468 is coupled near the top 47 of the second thermal storage unit 460. This inclined configuration of the conduit 468 may enable the removal of the third and fourth recharge valves 470, 472. In the subcooling mode, the cooling fluid 33 from the bottom of the first thermal storage unit 452 may flow through the conduit 468 and the inclined pipe 458 to a location near the top 47 of the second thermal storage unit 460, as shown by the solid arrows 462. This inclined configuration of the conduit 468 enables warm cooling fluid 33 to fill the first thermal storage unit 452 and cold cooling 33 to flow through the inclined pipe 458 and the conduit 468 to the second thermal storage unit 460, such that the warm layer 454 substantially fills the first thermal storage unit 452. When the first thermal storage unit 452 is filled with warm cooling fluid, warm cooling fluid 33 may flow through the inclined pipe 458 and the conduit 468 to form a stratified warm layer 454 and a cool layer 456 of cooling fluid 33 in the second thermal storage unit 460. In the recharge mode, the cooled cooling fluid 33 from the cooler 24 may flow into the first and second thermal storage units 452, 460 through the inclined pipe 458, and the cooling fluid 33 may flow from the first and second thermal storage units 452, 460 through the conduit 468 to be recharged (e.g., cooled) via the cooler 24. The inclined configuration of the conduit 468 may enable the removal of the third and fourth recharge valves 470, 472 to control flow during subcooling and recharge modes. As may be appreciated, some valves may be utilized to enable servicing or replacement of thermal storage units 36 and piping while operating with the remaining one or more thermal storage units 36. Additionally, or in the alternative, valves may be utilized for balancing flow between the first and second thermal storage units 452, 460 during recharge mode.

As will be appreciated, the systems and embodiments described above may include variations in components, configurations, operating parameters, and so forth, which may depend on the particular application of the cooling system 10 with the refrigerant circuit 20 and the subcooling system 12. For example, the compressors 26 described above may be configured for use with varying suction pressures. Such compressors 26 may include variable-speed centrifugal compressors, variable-speed reciprocating compressors, variable-stroke linear compressors, compressors with magnetic bearings, and so forth. For reciprocating and linear compressors, the discharge valve naturally compensates for changes in pressure ratio. Additionally, at high suction pressure, it may be desirable to reduce compressor capacity to prevent overload of the rest of the cooling system 10. Reduced compressor speed or reduced piston stroke also prevents overloading the suction and discharge valves for the reciprocating and linear compressors.

Furthermore, in addition to including the subcooling heat exchanger 32 in the refrigerant circuit (e.g., refrigerant circuit 20, refrigerant loop 350) of the cooling system 10, it may be desirable to make other modifications to the cooling system 10. For example, a subcooling section from the condenser 28 may be removed, which may allow more space for condensation and/or a reduction in condenser 28 size and cost. For air-cooled condensers, reducing the refrigerant charge in the condenser 28 may have a similar effect. For other cooling systems 10, it may be desirable to eliminate economizers to reduce costs, to reduce compressor 26 load during peak conditions, and/or to increase the energy storage capacity of the thermal storage unit 36 of the subcooling system 12. Likewise, it may be desirable to eliminate intercoolers found in multi-stage centrifugal compressors or other multi-stage systems.

As described above, the cooling fluid flow rate of the subcooling system 12 may be optimized to maximize efficiency of the subcooling system 12 to cool the refrigerant 25 of the refrigerant circuit 20 of the cooling system 10. In certain embodiments, the cooling fluid flow rate through the subcooling heat exchanger 32 may be selected such that the temperature change of the cooling fluid 33 across the subcooling heat exchanger 32 may be approximately equal to the temperature change of the refrigerant 25 across the subcooling heat exchanger 32. In some embodiments, the cooling fluid flow rate through the subcooling heat exchanger 32 may be selected such that the cooling fluid 33 exiting the subcooling heat exchanger 32 is approximately the same temperature as the refrigerant 25 entering the subcooling heat exchanger 32, and the refrigerant 25 exiting the subcooling heat exchanger 32 is approximately the same temperature as the cooling fluid 33 entering the subcooling heat exchanger 32.

Additionally, as described with reference to FIG. 2 above, the system may include a variety of sensors 50 and a controller 52 (e.g., an automation controller, programmable logic controller, distributed control system, etc.) configured to operate various components (e.g., valves) based on feedback measured by the sensors 50. It should be appreciated that the sensors 50 and controller 52, as well as other sensors and controllers, may be used with any of the embodiments described herein. For example, the sensors 50 may be configured to measure temperatures, pressures, flow rates, or other operating parameters of the refrigerant circuit 20 and/or the subcooling system 12. Additionally, the controller 52 may be configured to operate any of the components (e.g., valves, pumps) described herein or other components based on measured feedback.

As discussed above, the refrigerant circuit 20 and the subcooling systems 12 described herein may improve efficiency of the cooling system 10. Additionally, certain embodiments described above may have lower costs (e.g., first costs and/or operating costs) than other systems. For example, equipment costs, energy costs, maintenance costs, and other costs may be reduced. In some embodiments, thermal storage units 36 may reduce the foot print at a worksite utilized for a given cooling load. For example, a cooling system with a 10,000 ton capacity utilizing radiators rather than thermal storage units may have a foot print of approximately 38,220 ft$^2$, whereas a cooling system 10 with a 10,000 ton capacity as described above utilizing three thermal storage units 36 (e.g., 42 ft diameter, 30 ft height) and radiators may have a foot print of approximately 28,179 ft$^2$, which is approximately 24 percent smaller. Combinations of one or more of the disclosed embodiments may also be used. The various tank and piping configurations may be combined and may be desirable to meet the requirements of particular applications.

The cooling fluid 33 referenced in the embodiments described above may include primarily water. In some embodiments, the cooling fluid 33 may include water with a biocide and/or corrosion inhibitors. Propylene or ethylene glycol or other antifreeze can also be added to provide freeze protection. Non-aqueous liquids, slurries, etc. are also options for the cooling fluid 33. In some embodiments with stratified thermal storage units 36 having water-based solutions of cooling fluid 33, an additive that reduces the temperature of minimum density of the cooling fluid 33 may be utilized where the temperature of the cooling fluid 33 may be below approximately 39° F.

With regard to the piping forming the loops and flow paths discussed above, in freezing climates without antifreeze, exposed piping should be insulated and heat-traced to prevent possible freezing damage. The thermal storage units 36 may be open and may be naturally resistant to freezing damage, although heaters or insulation may be desirable in some cases.

It should be noted that certain embodiments described here can also be used as a heat pump for heating applications. A distinction between employing present embodiments as a heating system rather that cooling is that heat leaving the condenser is considered the primary output, although the system can simultaneously provide cooling as a useful output. A variation for heat pumps is to cool refrigerant liquid using incoming ventilation air either directly or through a secondary (glycol) loop.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A system, comprising:
    a refrigerant circuit configured to flow a refrigerant, comprising:
        a compressor in the refrigerant circuit;
        a condenser in the refrigerant circuit;
        an expansion device configured to expand the refrigerant in the refrigerant circuit;
        a subcooling heat exchanger disposed between the condenser and the expansion device in the refrigerant circuit; and
        a cooling heat exchanger in the refrigerant circuit, wherein the refrigerant flowing through the cooling heat exchanger is configured to cool a load fluid flowing through the cooling heat exchanger in a subcooling mode;
    a chilled fluid pump coupled to the cooling heat exchanger, wherein the chilled fluid pump is configured to pump the load fluid from a load to the cooling heat exchanger in the subcooling mode; and
    a subcooling circuit configured to flow a cooling fluid, comprising:
        the subcooling heat exchanger in the subcooling circuit, wherein the cooling fluid is configured to cool the refrigerant in the subcooling heat exchanger in the subcooling mode;
        a subcooling pump in the subcooling circuit, wherein the subcooling pump is configured to pump the cooling fluid from a thermal storage unit to the subcooling heat exchanger in the subcooling mode; and
        the thermal storage unit configured to store the cooling fluid in the subcooling circuit;
    wherein the thermal storage unit is fluidly coupled to the cooling heat exchanger in a recharge mode, the load is isolated from the cooling heat exchanger in the recharge mode, the subcooling pump is turned off in the recharge mode, the chilled fluid pump is configured to pump the cooling fluid from the thermal storage unit to the cooling heat exchanger in the recharge mode, and the thermal storage unit receives the cooling fluid from the cooling heat exchanger after the cooling fluid is cooled by the refrigerant in the cooling heat exchanger in the recharge mode.

2. The system of claim 1, wherein the thermal storage unit comprises a stratified cooling fluid tank.

3. The system of claim 1, wherein the thermal storage unit comprises a cooling fluid tank comprising a moveable partition defining a first reservoir and a second reservoir of the cooling fluid tank.

4. The system of claim 3, wherein the moveable partition comprises:
    an insulation layer;
    a weight coupled to the insulation layer; and
    a liner coupled to the insulation layer and the cooling fluid tank, wherein the liner forms a watertight seal between the first reservoir and the second reservoir.

5. The system of claim 1, wherein a flow rate of the cooling fluid is such that an increase in temperature of the cooling fluid across the subcooling heat exchanger is approximately equal to a decrease in temperature of the refrigerant across the subcooling heat exchanger.

6. The system of claim 1, wherein an effectiveness of the subcooling heat exchanger is greater than approximately 90 percent.

7. The system of claim 1, wherein the subcooling heat exchanger comprises a multi-pass brazed-plate heat exchanger that approximates counterflow between the refrigerant and the cooling fluid.

8. The system of claim 1, wherein the thermal storage unit comprises a subterranean ground loop.

9. The system of claim 1, wherein the thermal storage unit comprises:
    a first tank configured to supply a cold cooling fluid to the subcooling pump;
    a second tank configured to receive a warm cooling fluid from the subcooling heat exchanger; and
    a third tank fluidly coupled to the first tank and to the second tank, wherein the third tank is configured to cool warm cooling fluid received from the second tank into the cold cooling fluid, to provide the cold cooling fluid to the first tank, and to thermally isolate the cold cooling fluid in the first tank from the warm cooling fluid in the second tank.

10. The system of claim 1, wherein the cooling heat exchanger is configured to cool a chilled water flow with the refrigerant, and the chilled water flow is supplied to a cooling load.

11. The system of claim 1, wherein the subcooling pump is coupled to a bottom of the thermal storage unit, wherein in the subcooling mode, the subcooling pump is configured to flow the cooling fluid to the subcooling heat exchanger from the bottom of the thermal storage unit, through the subcooling heat exchanger, and to a top of the thermal storage unit.

12. The system of claim 1, wherein during the recharge mode the chilled fluid pump is configured to pump the cooling fluid through the cooling heat exchanger at a tank pressure of the thermal storage unit, and during the subcooling mode the chilled fluid pump is configured to pump the load fluid through the cooling heat exchanger at a load pressure different than the tank pressure.

* * * * *